United States Patent
Shamir et al.

(10) Patent No.: US 9,347,570 B2
(45) Date of Patent: May 24, 2016

(54) FLUID FILTERING UNIT AND SYSTEM

(75) Inventors: Yuval Shamir, D.N. Upper Gallilee (IL); Marina Olenberg, Kiryat Shmona (IL); Ra'anan Ben-Horin, D.N. Jordan Valley (IL); Tzur Alon, D.N. Jordan Valley (IL); Shahar Nuriel, Yesud HaMa'ala (IL); Ud Mussel, D.N. Lower Galilee (IL)

(73) Assignee: AMIAD WATER SYSTEMS LTD, Kibbutz Amiad (IL)

( * ) Notice: Subject to any disclaimer, the term of this patent is extended or adjusted under 35 U.S.C. 154(b) by 124 days.

(21) Appl. No.: 13/878,024

(22) PCT Filed: Oct. 6, 2011

(86) PCT No.: PCT/IL2011/000793
§ 371 (c)(1),
(2), (4) Date: Jun. 19, 2013

(87) PCT Pub. No.: WO2012/046240
PCT Pub. Date: Apr. 12, 2012

(65) Prior Publication Data
US 2013/0255202 A1    Oct. 3, 2013

Related U.S. Application Data

(60) Provisional application No. 61/390,823, filed on Oct. 7, 2010.

(51) Int. Cl.
*B01D 46/00* (2006.01)
*F16K 3/30* (2006.01)
(Continued)

(52) U.S. Cl.
CPC .............. *F16K 3/30* (2013.01); *B01D 29/0079* (2013.01); *B01D 29/114* (2013.01); *B01D 29/19* (2013.01);
(Continued)

(58) Field of Classification Search
CPC ........ B01D 46/68; B01D 29/33; B01D 29/48; B01D 29/52; B01D 29/79; B01D 29/114
USPC ............... 55/300, 303, 305; 210/333.01, 411, 210/541; 251/86, 322, 327
See application file for complete search history.

(56) References Cited

U.S. PATENT DOCUMENTS

| 1,531,609 A | 3/1925 | Groves |
| 3,068,901 A | 12/1962 | Anderson |

(Continued)

FOREIGN PATENT DOCUMENTS

| DE | 31 49 836 A1 | 6/1983 |
| DE | 88 00 059.1 U1 | 4/1988 |

(Continued)

OTHER PUBLICATIONS

The International Search Report for International Application No. PCT/IL2011/000793; three pages; mailed May 3, 2012.
(Continued)

*Primary Examiner* — Jason M Greene
*Assistant Examiner* — Karla Hawkins
(74) *Attorney, Agent, or Firm* — Susanne M. Hopkins; Roberts Mlotkowski Safran & Cole P.C.

(57) ABSTRACT

Provided is a fluid filtration assembly including a housing configured with one or more filter units extending in fluid flow between a raw fluid inlet port and a filtered fluid outlet port, a filter rinsing assembly being in fluid communication with a rinsing fluid inlet port, and propulsion fluid inlet port being in flow communication with a propulsion mechanism for propelling one or both of the filter rinsing assembly and the filter unit with respect to one another. Further provided is a thread tensioning mechanism for controlling tension of coiled threads of a thread-type filtering cartridge.

13 Claims, 30 Drawing Sheets

(51) Int. Cl.
    *B01D 29/11*     (2006.01)
    *B01D 29/19*     (2006.01)
    *B01D 29/33*     (2006.01)
    *B01D 29/48*     (2006.01)
    *B01D 29/52*     (2006.01)
    *B01D 29/64*     (2006.01)
    *B01D 29/66*     (2006.01)
    *B01D 29/68*     (2006.01)
    *B01D 29/70*     (2006.01)
    *B01D 29/90*     (2006.01)
    *B01D 35/153*    (2006.01)
    *F16K 11/065*    (2006.01)
    *F16K 11/074*    (2006.01)
    *B01D 29/00*     (2006.01)

(52) U.S. Cl.
    CPC ............... *B01D 29/33* (2013.01); *B01D 29/48* (2013.01); *B01D 29/52* (2013.01); *B01D 29/6446* (2013.01); *B01D 29/668* (2013.01); *B01D 29/682* (2013.01); *B01D 29/684* (2013.01); *B01D 29/688* (2013.01); *B01D 29/70* (2013.01); *B01D 29/908* (2013.01); *B01D 35/153* (2013.01); *B01D 46/0068* (2013.01); *F16K 11/0655* (2013.01); *F16K 11/074* (2013.01); *B01D 2201/0415* (2013.01); *B01D 2201/082* (2013.01); *B01D 2201/186* (2013.01); *B01D 2201/583* (2013.01); *Y10T 137/794* (2015.04); *Y10T 137/87249* (2015.04)

(56) References Cited

U.S. PATENT DOCUMENTS

| | | | |
|---|---|---|---|
| 3,463,193 A | 8/1969 | Yost | |
| 4,130,478 A | 12/1978 | Swallow | |
| 4,284,103 A | 8/1981 | Pemberton | |
| 4,524,951 A * | 6/1985 | Green et al. | 251/327 |
| 4,617,120 A | 10/1986 | Barzuza et al. | |
| 4,624,785 A | 11/1986 | Drori | |
| 4,643,226 A | 2/1987 | Balz | |
| 4,655,911 A | 4/1987 | Tabor | |
| 4,838,312 A | 6/1989 | Berchem et al. | |
| 6,398,037 B1 | 6/2002 | Sadan et al. | |
| 7,192,528 B2 | 3/2007 | Prochaska et al. | |
| 7,309,057 B2 | 12/2007 | Santiago | |
| 7,581,649 B2 | 9/2009 | Ben-Horin | |
| 2009/0301590 A1 | 12/2009 | Waymire | |
| 2013/0299014 A1 | 11/2013 | Ben-Horin et al. | |

FOREIGN PATENT DOCUMENTS

| | | |
|---|---|---|
| DE | 39 20 097 A1 | 2/1990 |
| DE | 42 39 664 A1 | 6/1994 |
| DE | 10 2007 014 430 B3 | 7/2008 |
| EP | 0 119 340 A1 | 9/1984 |
| EP | 0 411 368 A2 | 2/1991 |
| EP | 0 435 097 A1 | 7/1991 |
| EP | 1 782 877 A2 | 5/2007 |
| EP | 1 813 779 A1 | 8/2007 |
| EP | 2 027 905 A2 | 2/2009 |
| FR | 2 407 410 A1 | 5/1979 |
| GB | 1 504 281 A | 3/1978 |
| GB | 2 256 599 A | 12/1992 |
| GB | 2 448 237 A | 10/2008 |
| JP | 10-9411 A | 1/1998 |
| WO | 2008/075327 A1 | 6/2008 |
| WO | 2010/119301 A1 | 10/2010 |

OTHER PUBLICATIONS

The International Search Report for International Application No. PCT/IL2011/000784; three pages; mailed Feb. 6, 2012.

* cited by examiner

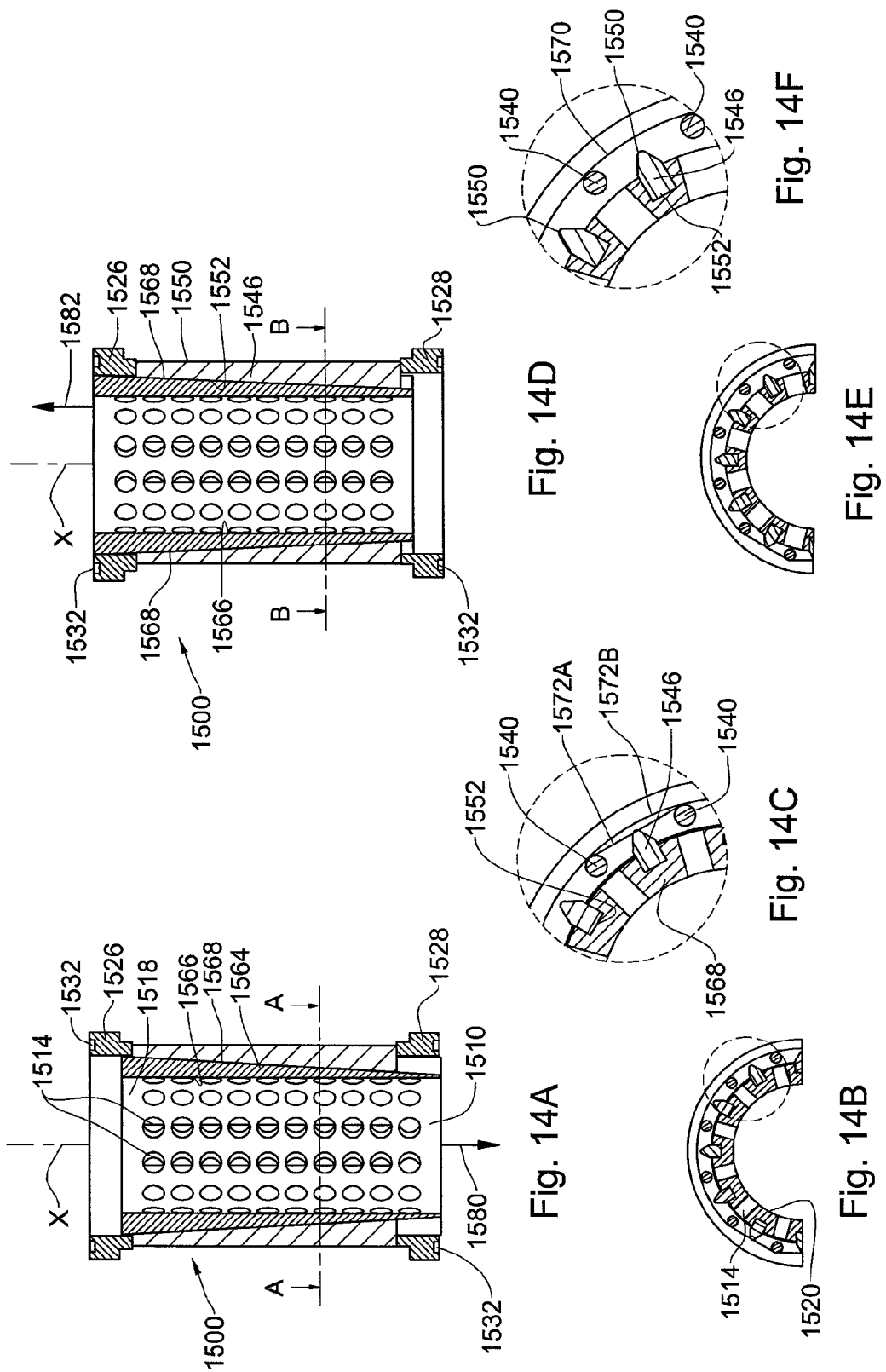

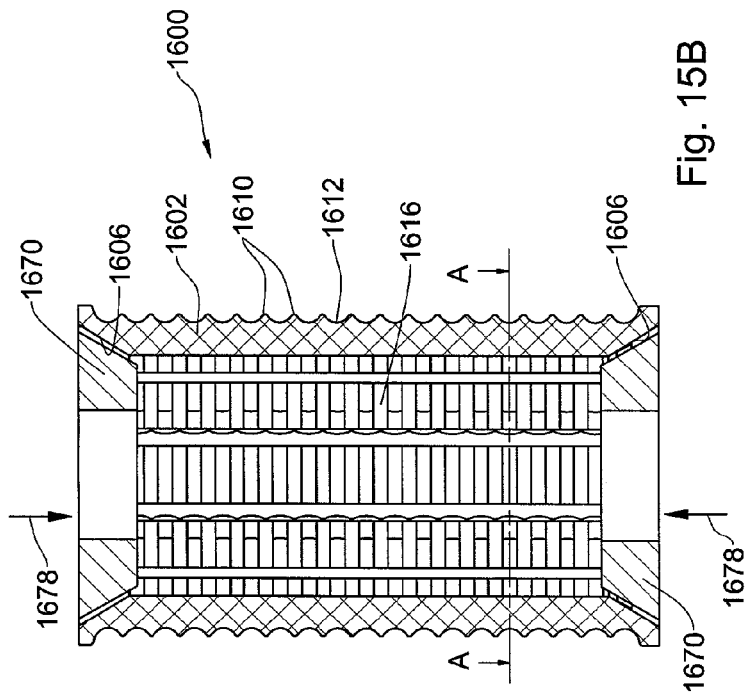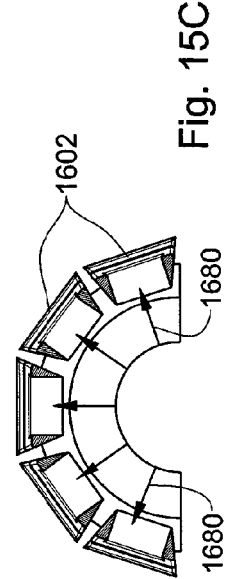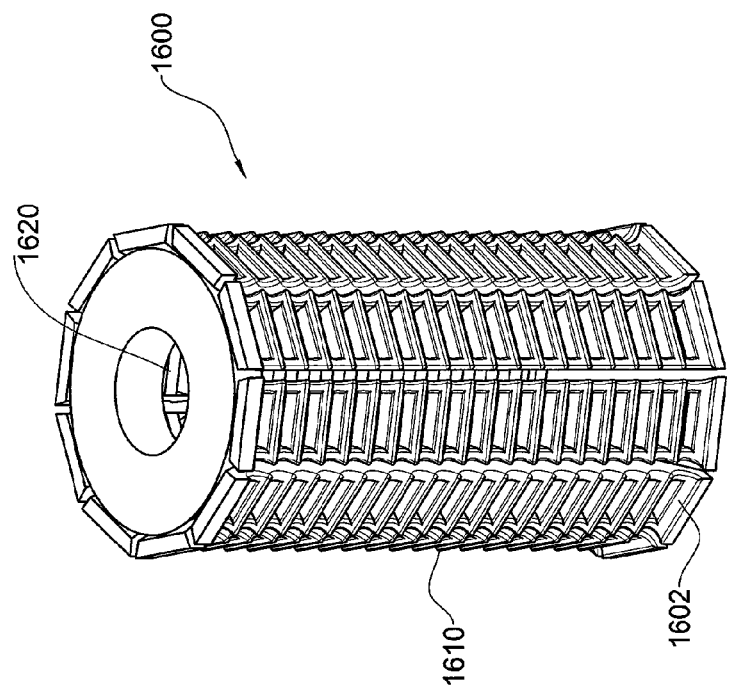
Fig. 15B
Fig. 15C
Fig. 15A

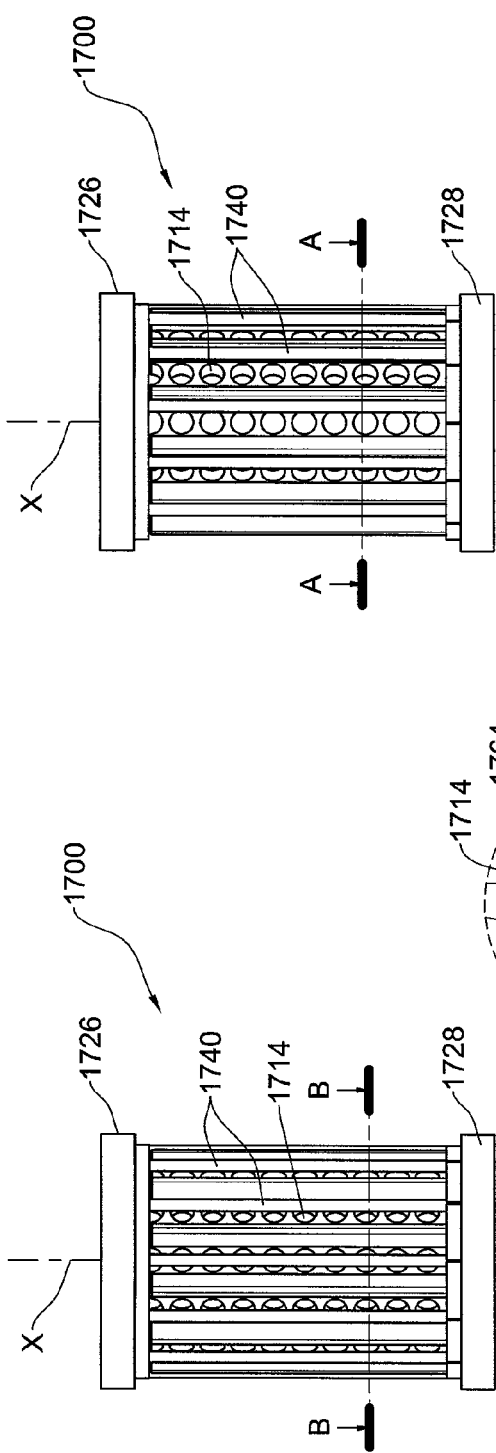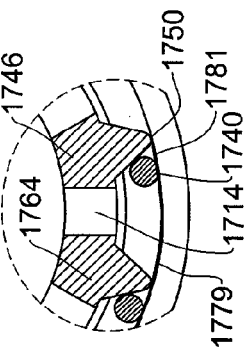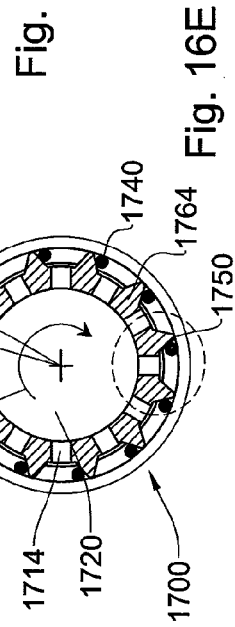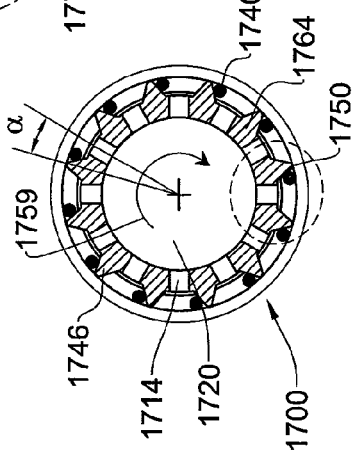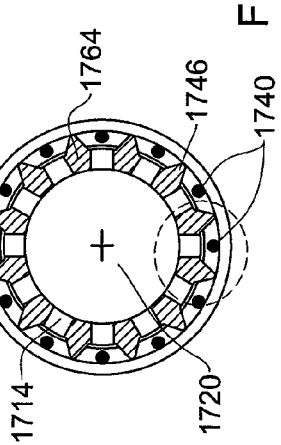

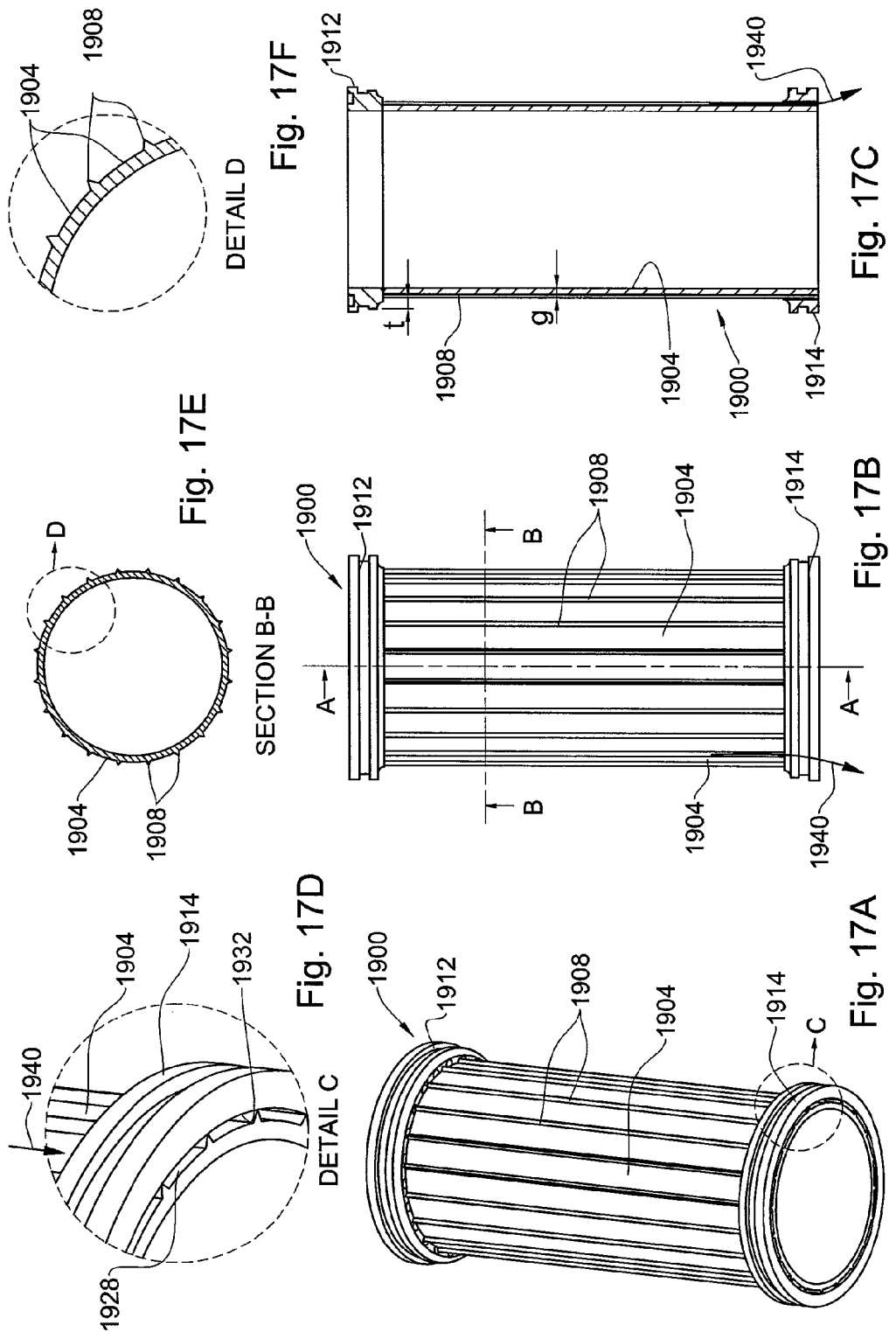

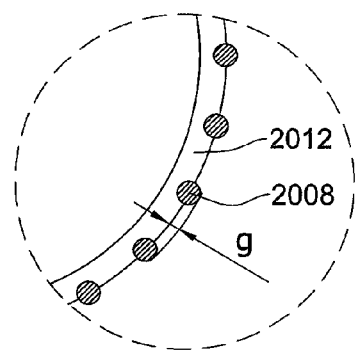
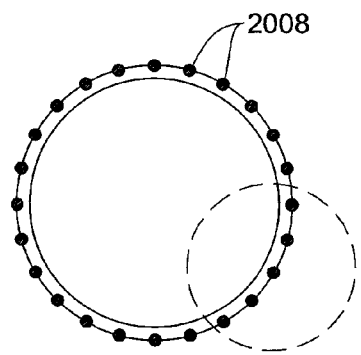
Fig. 18D
Fig. 18C
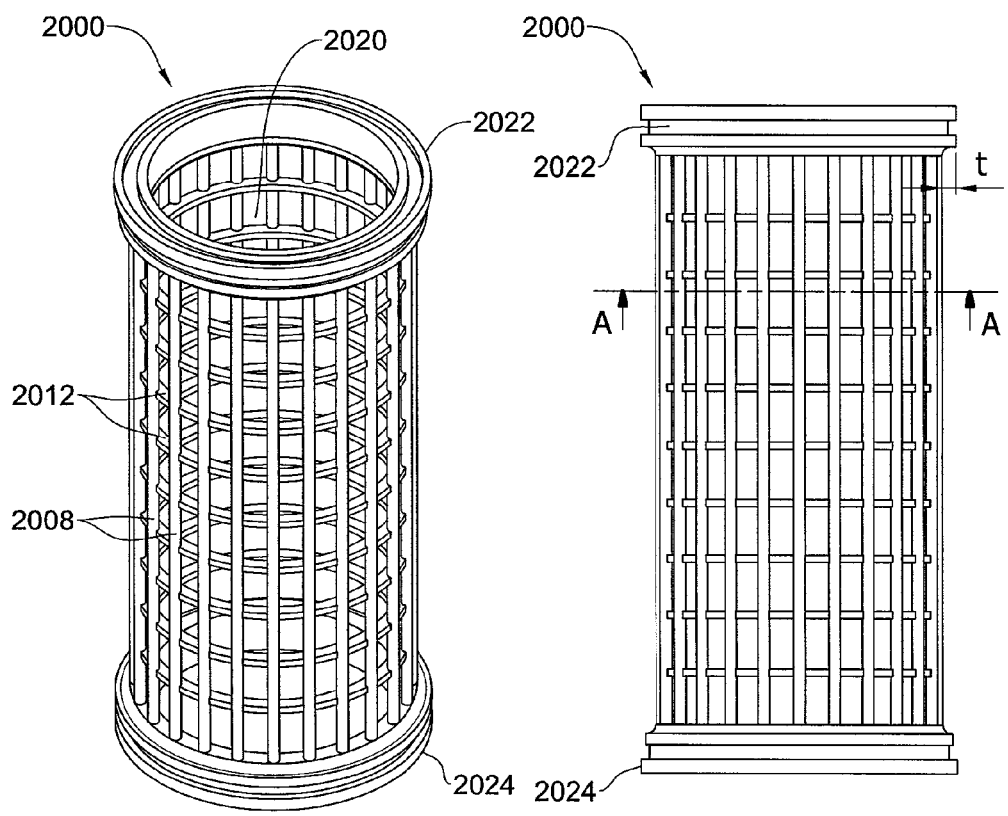
Fig. 18A
Fig. 18B ial matter of the filter elements to thereby open the spaces
between the filter elements to facilitate the flushing action.

FLUID FILTERING UNIT AND SYSTEM

FIELD OF THE DISCLOSED SUBJECT MATTER

The present disclosed subject matter is concerned with a filtering unit and filtering assemblies making use of same. The disclosed subject matter is further concerned with filter unit mechanisms.

More particularly, the disclosed subject matter is concerned with filtration units and assemblies configured with a rinsing mechanism for rinsing the filtration media. More specifically, the disclosure relates to so called self cleaning or self rinsing filtration systems, with a reverse flush or back flush configuration.

Filters and filtration systems in accordance with the disclosed subject matter may be used for filtering different fluid media, including gaseous material and different liquids such as fresh water, irrigation water, sea water, contaminated water including sewage, emulsions, viscous liquids, with the range of fluid pressure and other parameters thereof being substantially unlimited.

BACKGROUND OF THE DISCLOSED SUBJECT MATTER

Filtration systems are long in use for a variety of purposes and elitist in a wide diversity of configurations.

Self-cleaning filter systems are configured for rinsing (cleaning) the filtration media effectively without the need to open and dismantle the unit for cleaning the filter unit and the filtration media manually.

Self-cleaning filter systems are also known in the art. For example, U.S. Pat. No. 4,655,911 discloses a liquid filtering device, particularly for water irrigation installations, comprising a housing with inlet and outlet ports, a filter assembly within the housing, which comprises a filter member of a hollow elongated cylindrical configuration and a support member about which the filter member is adapted to spin during reverse, flushing liquid flow from the outlet to the inlet of the housing, characterized by a rotatable sprinkler member provided in an annular space between the outer surface of the support member and the inner surface of the filter member, and by valve means for feeding the liquid from the outlet to the sprinkle member, causing the latter to rotate and spray liquid jets therearound against the said inner surface of the filter member.

U.S. Pat. No. 7,192,528 discloses an apparatus, comprising a ring disc filter system having a housing, a stack of ring disc filter elements in the housing with an inlet and an outlet for fluid to flow from the inlet through the stack of filter elements and outwardly to the outlet, a plurality of spine legs internally of said stack of ring disc elements, a fluid diverter to direct fluid during normal filtering operations from the inlet through the ring disc filter elements to create a filtering action, the improvement comprising: a. a spray tube positioned internally of said spine legs and having a plurality of fluid orifices therethrough axially spaced along the length thereof; b. said spray tube being disposed inwardly of said stack of ring disc filter elements for directing fluid outwardly through said ring disc filter elements to flush impurities into the housing; c. an outlet for discharging the fluid with impurities from the apparatus; and d. a compression plate assembled on said spray tube for normally holding the filter elements together for filtering out impurities in the fluid; and said compression plate and said spray tube being movable together in response to fluid pressure flowing upwardly in the spray tube to relieve pressure on the filter elements to thereby open the spaces between the filter elements to facilitate the flushing action.

SUMMARY OF THE DISCLOSED SUBJECT MATTER

According to a first of its aspects, the present disclosure relates to a fluid filtration assembly configured with a backflow rinsing mechanism.

The following is a list of terminology used throughout the specification and claims:

Fluid—any flowable matter, i.e. gas or liquid, regardless its purpose, degree of contamination, particle size, viscosity, pressure or any other parameters. Hence, herein in the specification and claims the term fluid is used in its broadest sense.

Filter unit—a unit comprising one or more fluid filtering media, of one or more types, through which raw fluid is passed for filtration thereof;

Filtering media—any form of filtering material and configuration, e.g. a compacted stack of filtering disks, a filtering screen (i.e. a fine mesh of material), a thread-type cylinder, etc.;

Cleaning unit—a structure comprising one or more fluid ports extending opposite a filtering unit, for applying a fluid jet and/or applying suction there against, to remove dirt and particles from a fluid filtering media;

Raw fluid (identified in the relevant drawings by 'R' indexed arrows)—denotes a fluid (gas or liquid) to be filtered;

Rinsing fluid (identified in the relevant drawings by 'C' indexed arrows)—denotes a fluid (gas and/or liquid) used for rinsing/flushing the filter unit or filtering media or other components of the filter assembly. It should be noted that in some cases filtered fluid serves as a rinsing fluid;

Filtered fluid (identified in the relevant drawings by 'F' indexed arrows)—denotes the fluid/liquid obtained after a filtration process, namely after removing particles and contaminating matter;

Propulsion fluid (identified in the relevant drawings by 'P' indexed arrows)—denotes a fluid (gas and/or liquid) used as an hydraulic/pneumatic propulsion agent used for displacing one or both of a filter unit and cleaning unit in either or both axial or rotary orientation. The rinsing fluid, according to several configurations, may also function as a propulsion fluid.

According to the first aspect of the disclosed subject matter there is disclosed a fluid filtration assembly comprising a housing configured with one or more filter units extending in fluid flow communication between a raw fluid inlet port and a filtered fluid outlet port; a filter rinsing assembly being in fluid communication with a rinsing fluid inlet port; and propulsion fluid inlet port being in flow communication with a propulsion mechanism for propelling one or both of the filter rinsing assembly and the filter unit with respect to one another.

It is appreciated that the filter media in a filtration system according to the present disclosed subject matter can be any type of filtering media such as a stack of filtering disks, a filtering screen (i.e. a fine mesh of material) or a thread-type cylinder, and the following illustrated examples are by no means limited to any one or more exemplified filtering media, or other.

However, according to a particular example, the filtration media is a thread-type filter, comprising a thread tensionaly coiled over a support member and constituting a fine filtration media. Such a filtration media is configured as a thread cartridge.

Any one or more of the following features and designs can be configured with a filtration system according to the presently disclosed subject mater, independently or in combination:

- The fluid ports can facilitate for more than one function, depending on a particular performance of the filtration assembly at a given time;
- Either one or both of the filtration media and the filter rinsing assembly are configured for at least one of revolving motion and linear displacement;
- revolving motion either or both of the filtration media and the filter rinsing assembly can be continuous (i.e. unidirectional) or reciprocal;
- filtration through the filtration media can take place in a radially inwards or radially outwards direction;
- the rinsing assembly is configured for removing dirt and particles from the fluid filtering media. This can be configured by emitting a jet of fluid against the filtering media or by applying suction forces. According to a particular configuration there is disclosed a combined operation comprising rinsing and suction, simultaneous or intermittent structure comprising one or more fluid ports extending opposite a filtering unit, for applying a fluid jet and/or applying suction there against, to remove dirt and particles from a fluid filtering media;
- the filtration media can be configured as a one stage filter, or a multi-stage filter, i.e. comprising two or more filtration medias;

It is further noted that in some cases material filtered (sorted, separated) from the raw fluid is the material of interest, wherein the system functions as a 'sorting system'.

Furthermore, hereinafter propulsion of either the filtering unit or the rinsing assembly (either/or revolving and axial displacement) may be facilitated by any sort of mechanism, e.g. hydraulic/pneumatic/electric/electromagnetic arrangements, i.e. pistons, turbines solenoids, etc.

Respective inlet ports and outlet ports may serve for more than one function. For example, a certain port may function at one stage as a raw fluid inlet port and at another stage may function as a waste/rinsing outlet port.

A fluid jet for cleaning/rinsing the filtration media can be applied at any shape, using appropriate jet nozzles, e.g. pointed jet, elongate jet, etc. it is noted that a jet having a small cross-section area typically provides higher pressure rendering rinsing more effective. However, using small jets requires and adequate screening system for displacing either or both of the filtration media and the one or more jets, with respect to one another, so as to obtain optimal coverage of a cleaning process.

As opposed to pointed (local/concentrated) jets, there may be configured one or more elongate shaped jets with revolving displacement of either or both of the filtration media and the one or more jet members. Likewise, one or more annular or sartorial jets can be applied, however again requiring axial displacement of either or both of the filtration media and the one or more jet members.

According to another aspect of the disclosed subject matter there is provided a tensioning/loosening mechanism for respective tensioning/loosening the coiled threads of a thread-type filtering cylinder, between a filtering mode and a rinsing mode, respectively. It is appreciated that according to some particular configurations the filtering media is tensioned during rinsing thereof and is slack during a filtering mode.

The thread tensioning mechanism for controlling tension of coiled threads of a thread-type filtering cylinder, comprises an array of thread supports axially extending and being radially displaceable between a tensioned filtering mode and a loose rinsing mode, respectively.

Any one or more of the following features and designs can be applied, independently or in combination, with a thread tensioning mechanism of the present disclosed subject matter:

- the thread supports are longitudinal segments which at the loose rinsing mode are radially retracted such that longitudinal edges of neighboring longitudinal segments adjoin one another, and at the tensioned filtering mode longitudinal edges of neighboring longitudinal segments are spaced;
- at least some of the thread supports are configured with thread positioning members, said members transecting a longitudinal axis of the filtering cylinder;
- the tensioning mechanism is configured with a mechanism for converting axial motion in a longitudinal axis into radial motion in plane normal to said longitudinal axis;
- a displeasing end plate is provided at respective ends of the tensioning mechanism, said end plates being coaxial with and axially displaceable about a longitudinal axis of the filtering cylinder and bearing against end edges of the longitudinal segments, wherein one or both of the end plates and the end edges are configured with a tapering surface, whereby axial displacement of the end plates entails radial displacement of the longitudinal segments;
- the thread supports comprise an array of spaced apart fixed longitudinal support members and an array of rotatably disposed support beams interposed between the support members, said support beams radially projecting between said support beams substantially to the same extent as of said support members, wherein at the tensioned mode said support beams extend substantially equally distanced between two neighboring support members and at the loose mode said support beams extend adjacent one of two neighboring support members;
- the thread supports comprises an array of longitudinal support members having an external thread engaging surface extending parallel to the longitudinal axis and in inside surface inclined with respect to the longitudinal axis and being slidingly disposed over an equally inclined carrier member, whereby axial displacement of one or both of the support members and the carrier member towards one another entails radial expansion of the support members, and axial displacement of one or both of the support members and the carrier member away from one another entails radial retraction of the support members;
- the support members are longitudinal bars slidingly retained within tapering grooves axially configured over cylindrical carrier member.

According to yet another aspect of the disclosed subject matter there is provided a core structure for supporting thread coils of a thread-type filtering cylinder, whilst facilitating adequate fluid flow there through.

Thus, there is provided a core structure for supporting thread coils of a thread-type filtering cylinder, said core structure comprising a ridged cylindrical structure configured with a plurality of axially extending spacers radially projecting from an external surface defined by the cylindrical structure, defining a filtration space between said external surface and a perimeter defined by said plurality of spacers, said filtration space being in flow communication with one or both an inside space within the cylindrical structure and end plates of the cylindrical structure.

Any one or more of the following features and designs can be applied, independently or in combination, with a core structure of the present disclosed subject matter:

- the external surface is an external face of a cylindrical tubular member;
- the external surface is defined by an array of coaxially disposed rings supported by the longitudinal spacers;
- the end plates radially project beyond the spacers and a plurality of openings are axially formed in the end plates, facilitating fluid flow communication with the filtration space.

The disclosed subject matter is also aimed at providing fluid flirtation system comprising a housing accommodating a plurality of filtration units parallely disposed within the housing, and a cleaning assembly within the housing, wherein one or both of the filtration units and cleaning assembly are rotatably and/or axially disposed within the housing to facilitate rinsing of filtering media of the filter units.

BRIEF DESCRIPTION OF THE DRAWINGS

In order to understand the different aspects of the disclosed subject matter, and to see how it may be carried out in practice, embodiments will now be described, by way of non-limiting examples only, with reference to the accompanying drawings, in which:

FIGS. 3A and 3B are isometric views, partially cutout, of a filter assembly similar to that disclosed in FIG. 2 with filtered fluid selectively directed for hydraulic propulsion of the rotary cleaning unit, wherein:

FIG. 3A illustrates the filter assembly at a filtering stage; and

FIG. 3B illustrates the filter assembly at a rinsing stage;

FIGS. 5A and 5B are isometric views, partially cutout, of a filter assembly wherein filtering takes place from an outside surface of the filter unit, and rinsing takes place by propelling the filtering unit by filtered fluid serving also as a rinsing fluid, wherein:

FIG. 5A illustrates a filtering state of the filter assembly; and

FIG. 5B illustrates a rinsing state of the filter assembly;

FIG. 12 is an isometric view, partially cutout, of a filter assembly wherein the filter unit is axially displaceable against a static cleaning unit fitted with a plurality of jet emitting nozzles, wherein:

FIG. 13 is an isometric view, partially cutout, of a filtering assembly wherein the filter unit is static and a cleaning unit comprises a jet emitting assembly axially displaceable within the static filter unit, wherein:

FIGS. 14 to 20 are directed to different configurations of thread-type filtering cylinders configured with a tensioning/loosening mechanism, wherein:

FIGS. 14A to 14F are directed to a filter cylinder configured with radially displaceable axial tensioning mechanism;

FIGS. 15A to 15F are directed to a thread-type filter cylinder configured with a sectorial array of thread supports axially displaceable between a tensioned position and loose position;

FIGS. 16A to 16F are directed to a thread-type filter cylinder wherein tension/loosening of the threads is facilitated by virtue of a rotatable cog-like cylinder;

FIGS. 17A to 17F are directed to a thread-type cylinder support configured with cleaning apertures and axial flow passes;

FIGS. 18A to 18D are a modification of the thread-type filter cylinder support seen for example in FIG. 17;

DETAILED DESCRIPTION OF EMBODIMENTS

Attention is first directed to FIGS. 1-13 of the drawings directed to a first aspect of the present disclosed subject matter, concerned with a filtration assembly and various cleaning/rinsing modes thereof.

In the following drawings, the following indexing for fluids is used:

Raw fluid—identified in the relevant drawings by hollowed arrows;

Rinsing fluid—identified in the relevant drawings by hatched arrows;

Filtered fluid—identified in the relevant drawings by solid arrows;

Propulsion fluid—identified in the relevant drawings by dotted arrows.

It is appreciated that the filter unit in the following examples may be any type of filtering media such as a stack of filtering disks, a filtering screen (i.e. a fine mash of material) or a thread-type cylinder.

Figure 1:
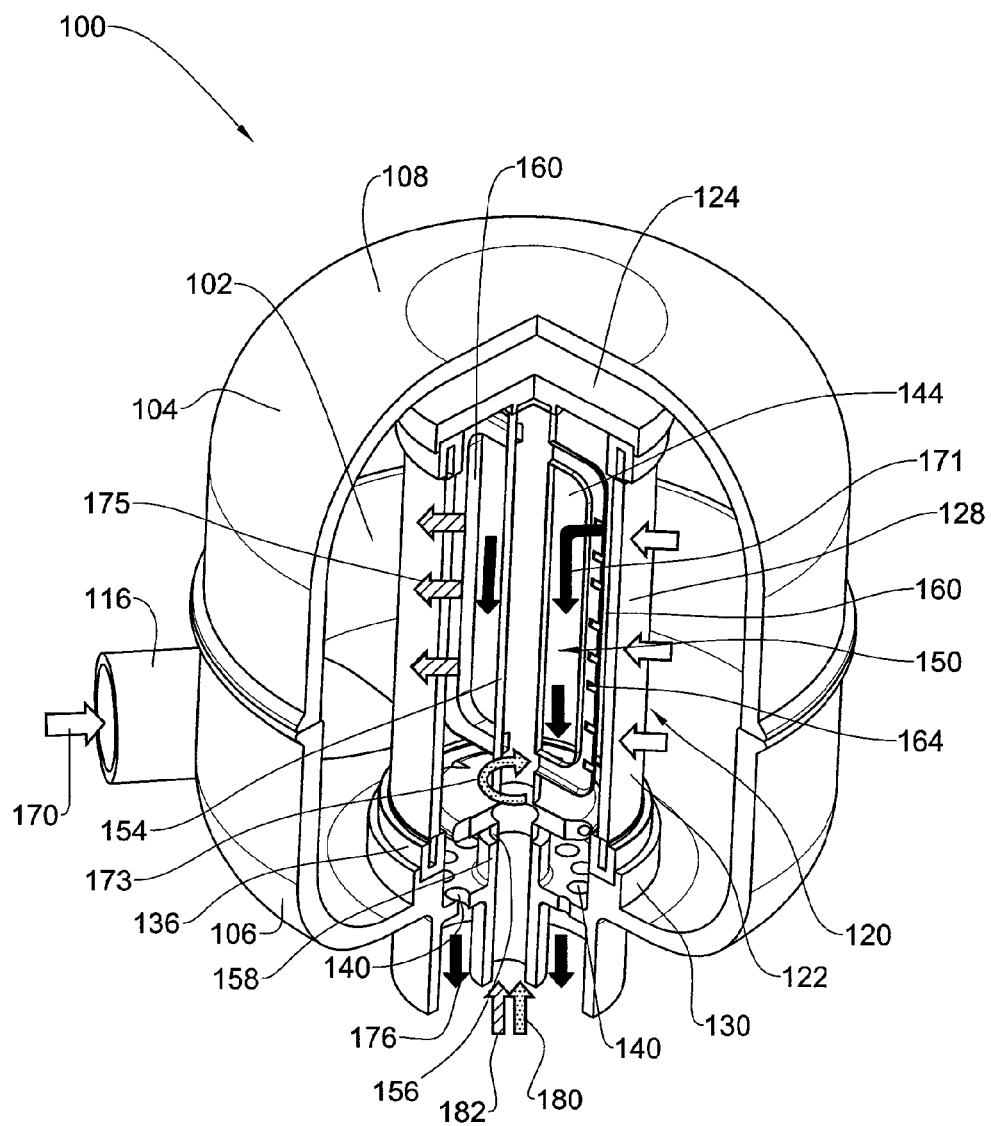
FIG. 1 is an isometric view, partially cutout, of a filter assembly wherein the raw fluid flows from an outside surface of a fixed filter unit to an inside space thereof and further configured with an internal hydraulic rotary cleaning unit.

Turning now to FIG. 1 of the drawings there is illustrated a filter assembly generally designated 100 comprising a rigid, pressure resistant, housing 104 composed of a base member 106 and a domed cover 108 articulated thereto e.g. by bolts, welding, clamps and the like.

The housing is configured with an inlet port 116 suited for coupling to a source of raw water (not shown). A filter unit generally designated 120 is fixedly secured within the housing 104, wherein the filter unit 120 is a closed structure filtering media 122, namely comprising a top cover 124, and is secured to a filter unit mount 130 fitted at a bottom portion of the housing base 106, rigidly accommodating a support ring 136 of the filter unit 120.

It is appreciated that the filter unit 120 may be any type of filtering media such as a stack of filtering disks, a filtering screen (i.e. a fine mash of material) or a thread-type cylinder, etc.

According to one particular example, However, according to a particular example, the filtration media is a thread-type filter, comprising a thread tensionaly coiled over a support member and constituting a fine filtration media. Such a filtration media is configured as a thread cartridge configured for fine filtration.

Extending at a lowermost portion of the base member 106 there are a plurality of openings constituting an outlet port 140 being in flow communication with a space 144 within the filtering unit 120, said outlet port 140 serving for collecting the filtered fluid as will be disclosed hereinafter in further detail. Whilst illustrated at a lowermost portion of the base member 106, it is noted that the outlet ports may extend also at any level above the lowermost portion of the base member.

A rotary cleaning/rinsing unit generally designated 150 is rotatably supported within the space 144 inside the filter unit 120. The cleaning unit 150 comprises a central stem 154 rotatably secured at its bottom 156 to a central support hub 158 serving as a rinsing fluid inlet and propulsion fluid inlet. A plurality of rinsing sprinkler arms 160 (only two seen in the example of FIG. 1) are articulated to the central stem 154 and are in flow communication therewith, said sprinkler arms 160 comprising a plurality of rinsing jet nozzles 164 extending radially off side to thereby give rise to rotation propulsion of the cleaning unit 150.

At a filtering stage of the filter 100, raw fluid e.g. a designated by arrow 170 enters the space 102 of the filter housing through inlet port 116 and owing to pressure of the raw fluid it is forced to pass through the filtering media 122 resulting in filtration of the fluid whereby filtered fluid represented by solid arrows 178 now collects within the inner space 144 of the filter unit 120 and dirt such as particles, contaminating agents and the like, collect at the external surface 128 of the filter unit 120 and at the bottom of the filter housing 104. The filtered fluid (such as water) will then exit through the openings of the outlet port 140, as designated by solid arrows 178.

At a cleaning/rinsing state of the filter 100, fluid ingress through inlet port 116 is seized and then a fluid (e.g. fresh water) serving both as rinsing fluid (indicated by hatched arrow 182) and propulsion fluid (indicated by dotted arrow 180) is provided through a central inlet 156 (coaxial with outlet port 140). The rinsing fluid (i.e. liquid in the present example) enters the rinsing stem 154 and the arms 160 thereof, resulting in generating of tangent force which eventually will cause the rinsing assembly 150 to rotate about a longitudinal axis thereof as represented by arrow 173, with a plurality of jets of rinsing liquid emitting through the nozzles 164 in direction of hatched arrows 175, thus rinsing dirt and particles from the external surface 128 of the filter unit 120. The rinsing fluid and the propulsion fluid are then allowed to drain through the port 116 (which at the filtrating stage discussed above served as an inlet port and at the cleaning/rinsing state serves as an outlet, for which purpose this port is temporarily disconnected from the supply of raw fluid, not shown).

It is appreciated that the filtering assembly is configured with a filtering media compacting/releasing mechanism (e.g. 245 in FIG. 2) for compacting and arresting the filtering media as needed at the filtering stage, whilst releasing pressure and allowing the filtering media to expand (and rotate about the longitudinal axis, in those cases where the filtering unit rotates during rinsing). This applies in fact to all the examples of FIGS. 2 to 8.

Figure 2:
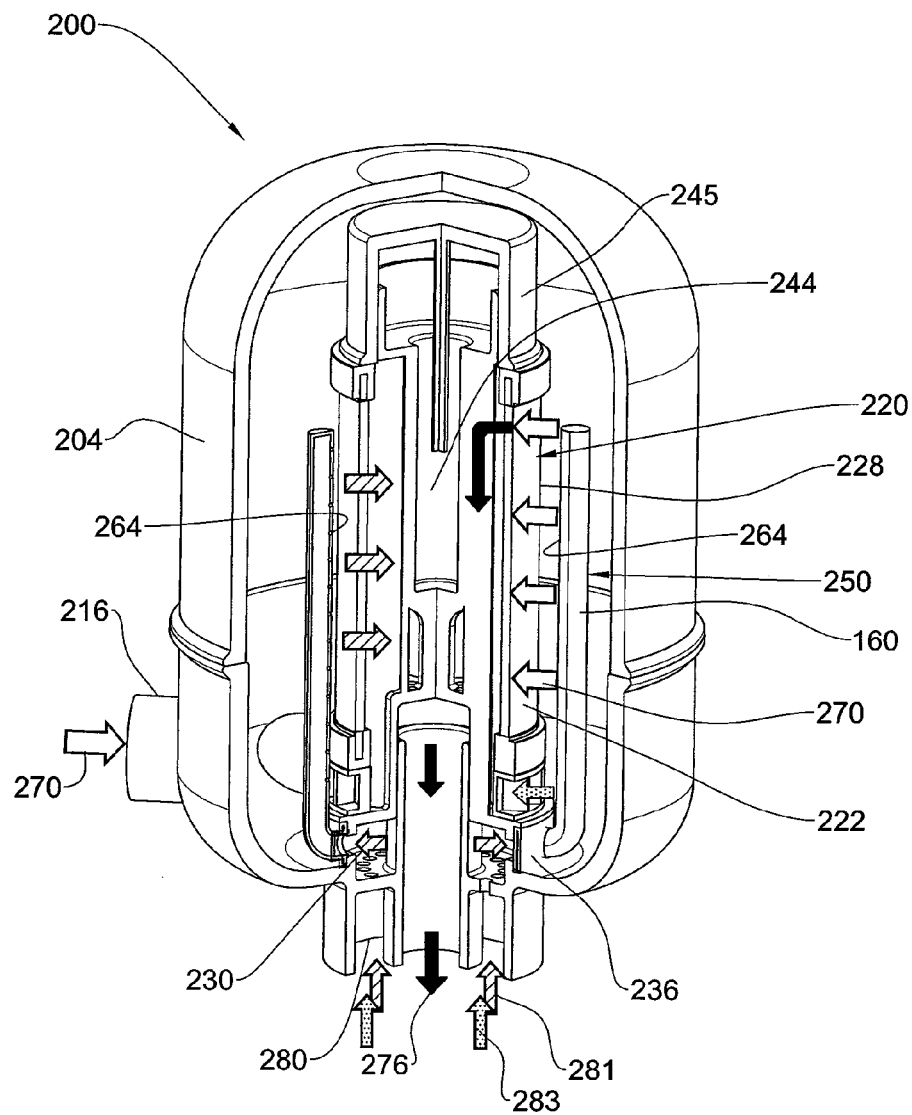
FIG. 2 is an isometric view, partially cutout, of a filter assembly wherein the raw fluid flows from an outside surface of a rotary filtering unit into a central space thereof, and further fitted with a static cleaning unit.

The embodiment illustrated in FIG. 2 is generally designated 200 and shares the general structure of the filter assembly illustrated in connection with FIG. 1 and for sake of clarity like elements have been designated with like reference numbers however shifted by 100.

In the embodiment of FIG. 2 the filter unit 220 is also of the configuration fixedly secured within the housing 204 wherein filtering of the raw fluid takes place in a direction from the outside of the filter unit 220 to its inside space 244 in the same manner as discussed in connection with the example of FIG. 1.

Thus, it is apparent that for a specific filtering assembly configuration there exist two operation modes, one wherein the filtering unit is fixed whilst the rinsing assembly rotates with respect to the filtering unit and emits jets of rinsing fluid there against, and the second wherein the filtering unit is rotatable about its longitudinal axis, whilst the rinsing assembly is fixed with respect thereto and emits jets of rinsing fluid against the revolving filtering unit.

However, in the example of FIG. 2, the cleaning unit 250 comprises a sprinkler arrangement configured of axially extending, flute-like sprinkler arms 160, each configured with a plurality of rinsing jet nozzles 264 facing towards the outside surface 228 of the rotary filter unit 220 and towards the turbine 236. The rotary filter unit 220 is secured at its bottom end by the turbine arrangement 236. The sprinkler arms 160 being in flow communication with a combined rinsing fluid inlet port and propulsion fluid inlet port designated 280 configured as an annular port coaxially extending over the rinsing fluid outlet port 276. A nozzle 267 applies a jet of fluid against the turbine 236, resulting in revolving the cleaning unit 250 upon applying of fluid through the sprinkler arms 160.

In the filtering stage raw fluid 270 (represented by hollowed arrows) is introduced through inlet port 216 and the pressurized fluid then passes the filtering media 222 (which, as already explained hereinabove, may be of any type namely a thread-type cylinder, a stack of filtering disks, a filtering screen and the like) resulting in filtration of the fluid. The filtered fluid then flows out in direction of solid arrows 276 through the outlet port 276.

The rinsing stage takes place by admitting combined rinsing fluid (arrows 281) and propulsion fluid (arrows 283) in through the uniform inlet port 280, resulting in propulsion of the rotary cleaning unit 250 so as to revolve about the longitudinal axis of the filter, wherein jets of rinsing fluid immerse through nozzles 264 to clean the filtering media 222, wherein an amount of the rinsing fluid flows out through the outlet 276 and residual fluid and dirt particles may be removed from the housing 204 through the inlet port 216 (upon disconnecting from the supply of raw fluid) (not shown).

Figure 3A:
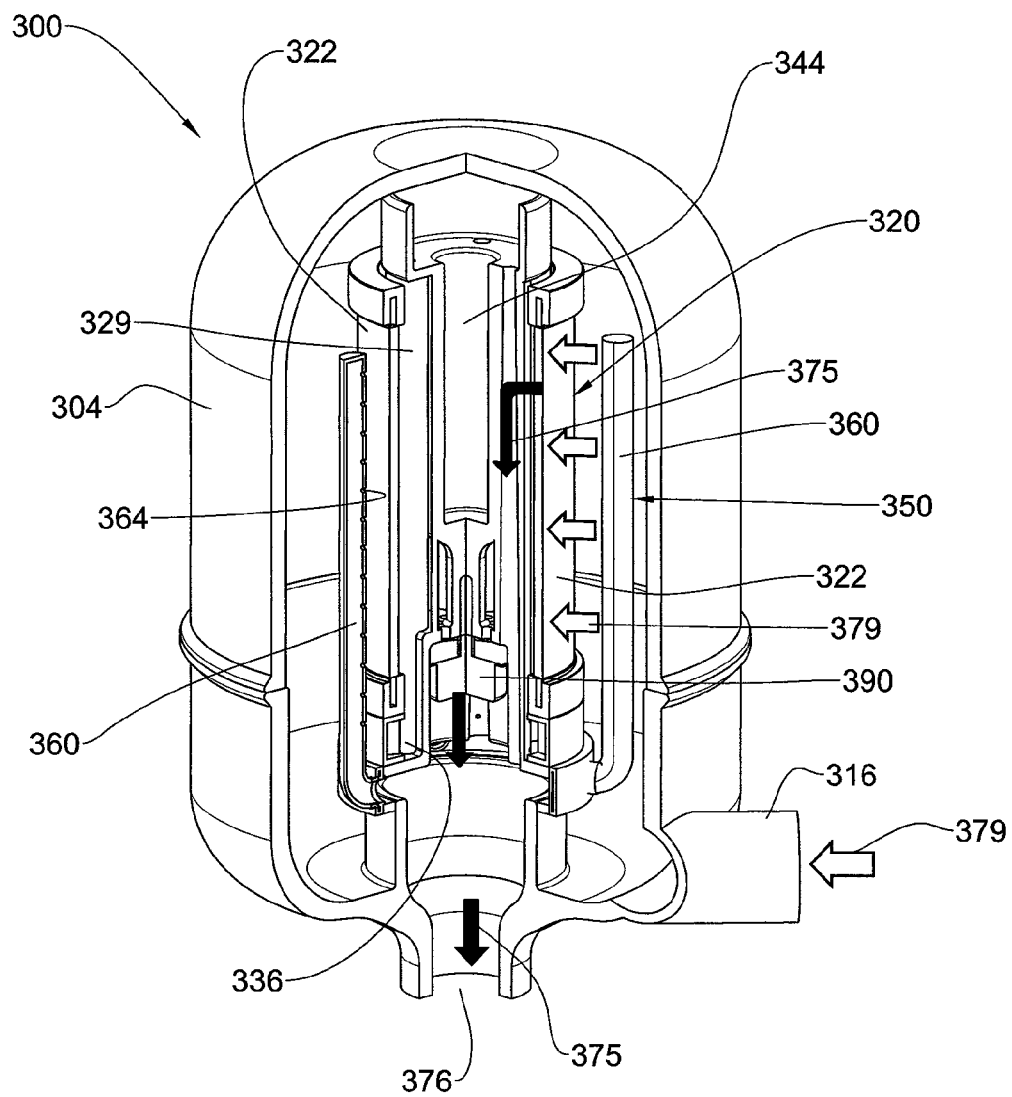

Turning now to the embodiment illustrated in FIGS. 3A and 3B there is illustrated a filter assembly 300 which is seemingly similar to the filter assembly 200 of FIG. 2 however, differing in that the rotary cleaning unit 350 is propelled by an internal hydraulic turbine 336 and further by the provision of a one-way valve 390 facilitating fluid flow only of fluid in direction towards the outlet port 376, as will be discussed hereinafter.

The arrangement is such that in the filtering stage of the filter 300 (FIG. 3A) the one-way valve 390 is open to facilitate fluid flow of filtered fluid in direction of the solid arrows 375 whereby raw fluid (hollowed arrows 379) entering the housing 304 through the inlet port 316 is forced through the filtering media 322 into the internal space 344 of the filter unit 320, wherein the filtered fluid (solid arrows 375) then flows out of the filter assembly 300 through a central outlet port 376 configured at a lowermost portion of the housing, extending in flow communication with the internal space 344 of the filter unit 320.

Figure 3B:
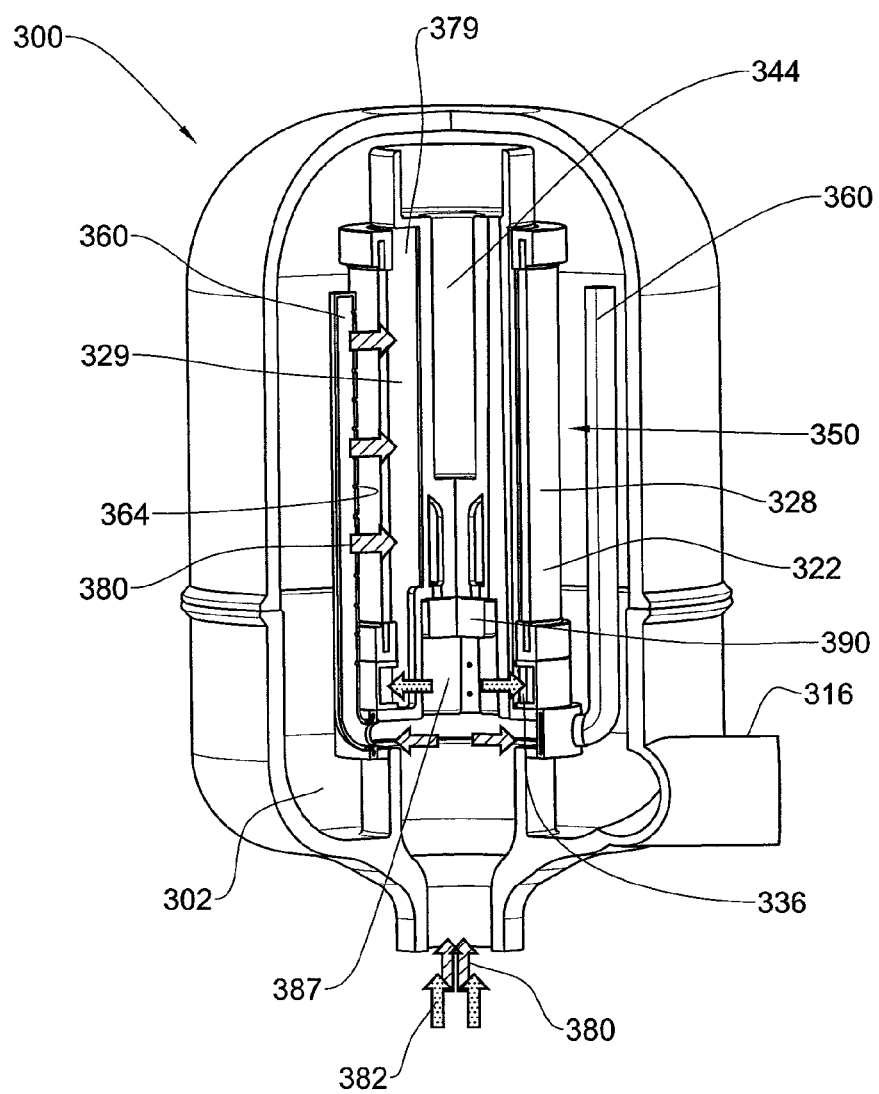

Turning now to FIG. 3B, when it is desired to clean/rinse the filter assembly 300, the one-way valve 390 is closed by the fluid pressure, resulting in disconnected a fluid flow path between the central space 344 within the filter unit 320 and the outlet port 376. In this position rinsing fluid (indicated by hatched arrows 380) and serving also as propulsion fluid (indicated by dotted arrows 382) are now admitted through the outlet port 376 (now serving as an inlet port) into the chamber 387, resulting in rotation of the rotary filter unit 320 by virtue of the internal hydraulic turbine 336 causing the filter unit 320 to rotate about the longitudinal axis of the assembly. The rinsing fluid (hatched arrows 380) immerses, in the form of cleaning jets through the cleaning jet nozzles 364 formed on the sprinkler arms 360 of the cleaning unit 350 for cleaning the external surface 328 of the filtering media 322, as well as the internal surface 329, whereby the rinsing fluid designated by hatched arrows 380 flows through the filtering media 322 into the internal space 379 (annular-shaped and coaxial over the central space 344 of the filter unit 320) and where the rinsing fluid may then egress into the space 302 of the housing from which it is removed through the inlet port 316 upon disconnecting from the raw fluid supply.

Whilst the description of FIGS. 3A and 3B refers to a rotary filtering unit and a stationary cleaning unit, it is apparent, as already mentioned hereinabove, that the same configuration may be used, however with a stationary filtering unit and a revolving cleaning unit, mutatis mutandis.

Figure 4:
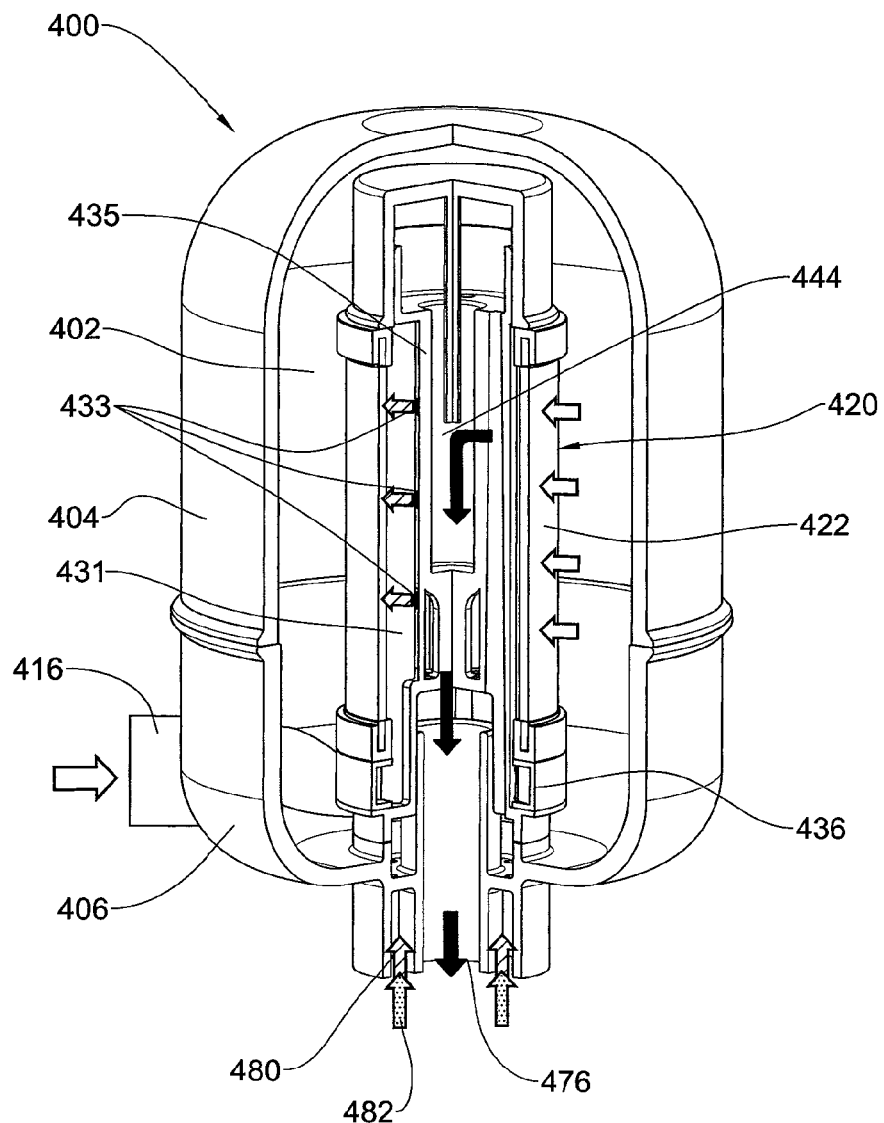
FIG. 4 is an isometric view, partially cutout, of a filter assembly wherein rinsing the filter unit takes place by hydraulic propulsion of the filter unit, with external supply of rinsing fluid.

Turning now to the embodiment of FIG. 4 there is illustrated a filter assembly 400 with a housing 404 fitted with an inlet port 416 configured for coupling to a raw fluid supply source (not shown) and a central filter unit designated 420 coaxially extending about a central axis of the filter assembly 400 and defining an internal space 444 such that fluids flowing into the space 402 of the filter assembly 400 are forced through the filtering media 422 upon which the fluid is filtered and then may exit through the outlet port at 476.

Coaxially extending about the outlet port 476 there is an annular-shaped rinsing fluid inlet (hatched arrows 480) serving also as a propulsion fluid inlet (dotted arrows 482), whereby the propulsion fluid entering is directed to a rotational hydraulic turbine 436 generating rotary motion which in turn imparts rotary motion to the filtering media 422 whereas the rinsing fluid extends into a space 431 between the filtering media 422 and a central support core element 435. The pressurized rinsing fluid applied through jet nozzles 433 rinses the filtering media 422 (from an inside surface thereof) allowing the dirt to collect at the bottom portion 406 of the space 402 of housing 404, which dirt and debris, together with the rinsing fluid may then be withdrawn through the inlet port 416 (upon disconnecting from the raw material supply source).

Figure 5A:
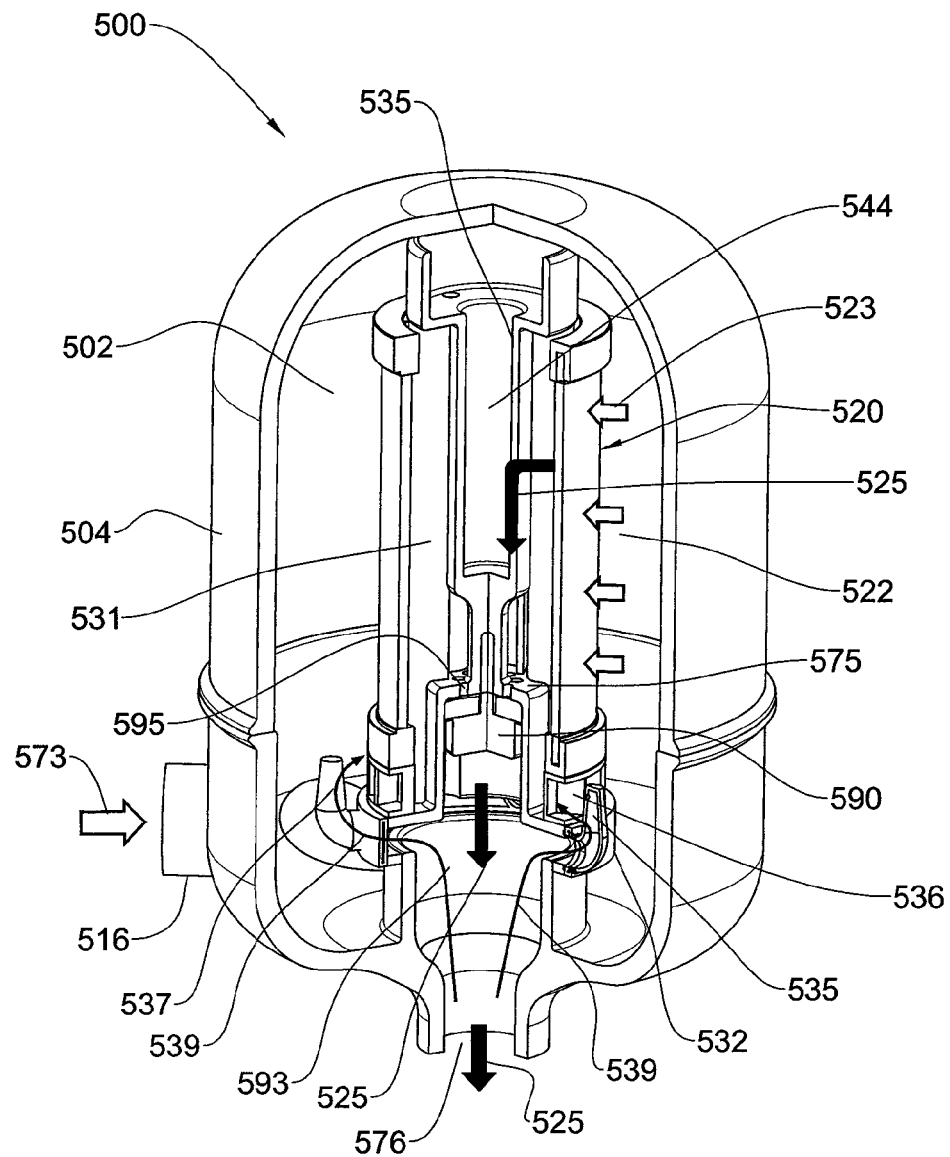
Figure 5B:
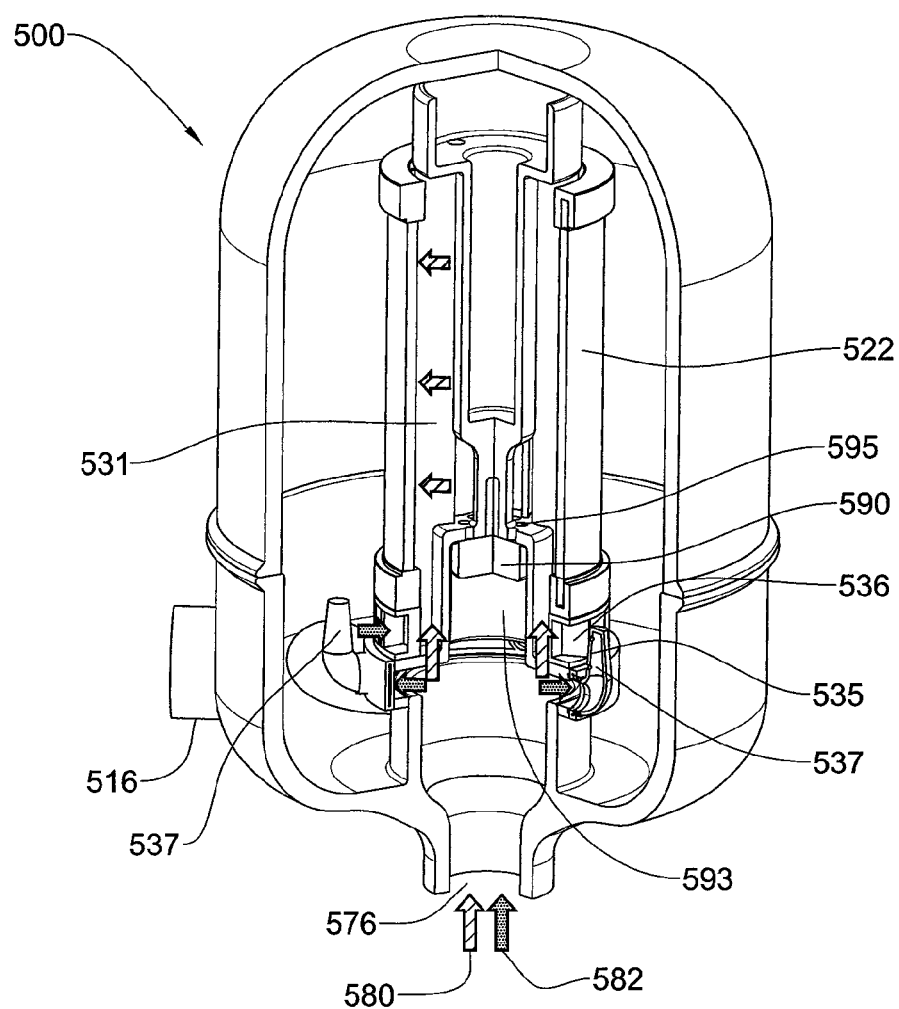

Turning now to FIGS. 5A and 5B there is illustrated a filter assembly 500 according to which filtration takes place radially inwards through the filtering media, whilst rinsing takes place in an opposite sense.

According to this example, the housing 504 is configured with an inlet port 516 and is fitted with a centrally positioned filter unit 520 comprising a filtering media 522 mounted over a hydraulic turbine unit 536 and configured for rotation about a longitudinal axis of the assembly. Received within the filter unit 520 there is a support core structure 535 defining an internal space 544 and an annular, coaxial space 531 extending between the filtering media 522 and the core member 535, wherein the central core member 535 is partitioned by a selective fluid flow path at 575 fitted with a one-way valve 590 facilitating fluid flow only in direction from the chamber 531 towards the intermediate chamber 593 towards the outlet port 576.

The arrangement is such that the one-way valve 590 selectively opens flow port 595 and is displaceable between an open position (FIG. 5A) and a closed position (FIG. 5B).

At a filtering stage of this example, as illustrated in FIG. 5A, raw fluid (hollowed arrows 523 enters the main space 502 of the filter assembly 500 via inlet port 516 and is then forced through the filtering media 522 and then out, as filtered fluid (solid arrows 525) through the flow port 595 into the intermediate chamber 593. The filtered fluid then exits through the outlet port 576. At the filtering stage of FIG. 5A the one-way valve 590 is at its open position namely displaced from the flow port 595 to facilitate fluid flow of the filtered fluid (solid arrows 525) therethrough.

Turning now to FIG. 5B the filter assembly 500 is illustrated at its rinsing stage, whereupon the one-way valve 590 is displaced upwards to thereby seal the flow apertures 595. At this stage, the supply of raw fluid (hollowed arrows 523) is disconnected to the inlet port 516 whilst rinsing fluid (hatched arrows 580) and propulsion fluid (dotted arrows 582) are introduced into the filter assembly 500 through the outlet port 576 (now serving as an inlet port).

The propulsion fluid (dotted arrows 582) is applied to the hydraulic turbine 536 through jet nozzles 535 fitted on lateral arms 537. The turbine 536 will now revolve about the longitudinal axis of the filter assembly, entailing revolution of the filter media 522 along with it. The propulsion fluid flows as indicated by dotted arrows 582 impinging against the impeller of the hydraulic turbine 536. The rinsing fluid (hatched arrows 580) then flows into the intermediate chamber 593, into the annular space 531 and then exits radially outwards through the filtering media 522 to rinse it from any dirt and particles which may have accumulated thereto, wherein the rinsing fluid and dirt are then drained through the inlet port 516.

Figure 6A:
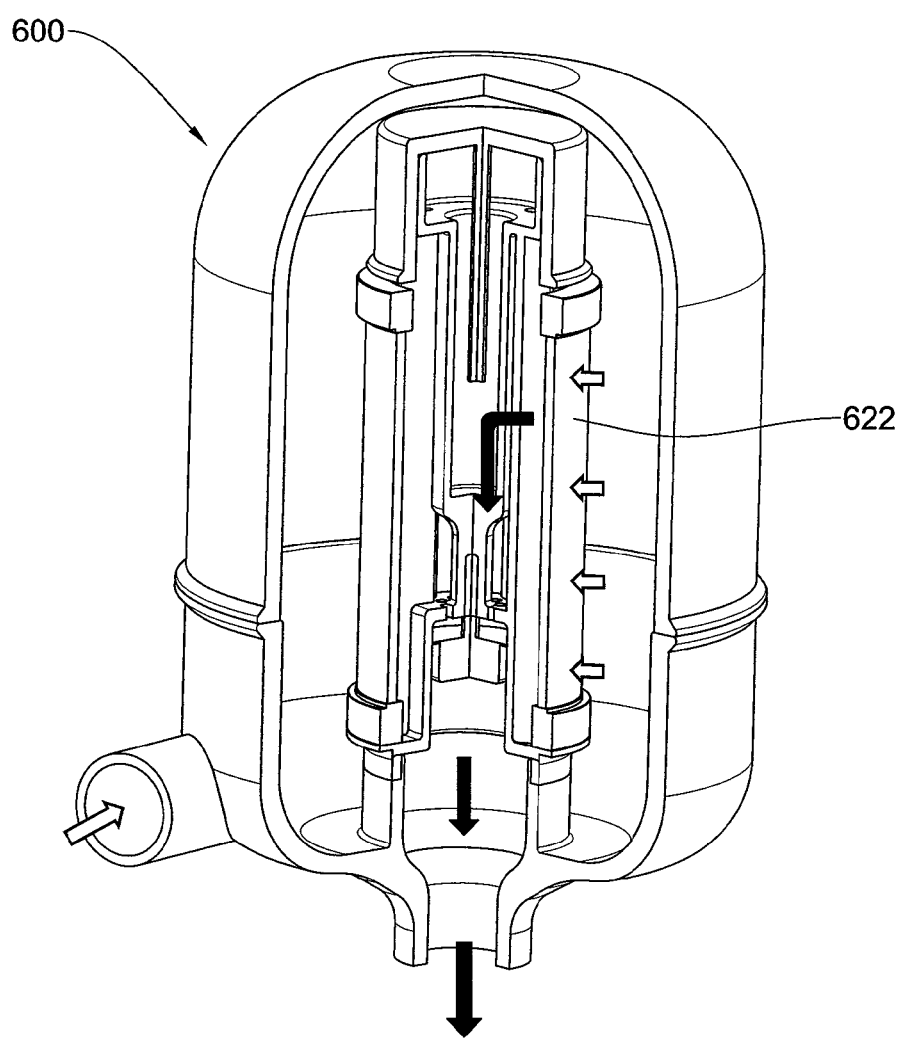
FIG. 6A is a modifications of the example illustrated in FIG. 5, illustrating the assembly at a filtering state thereof.
Figure 6B:
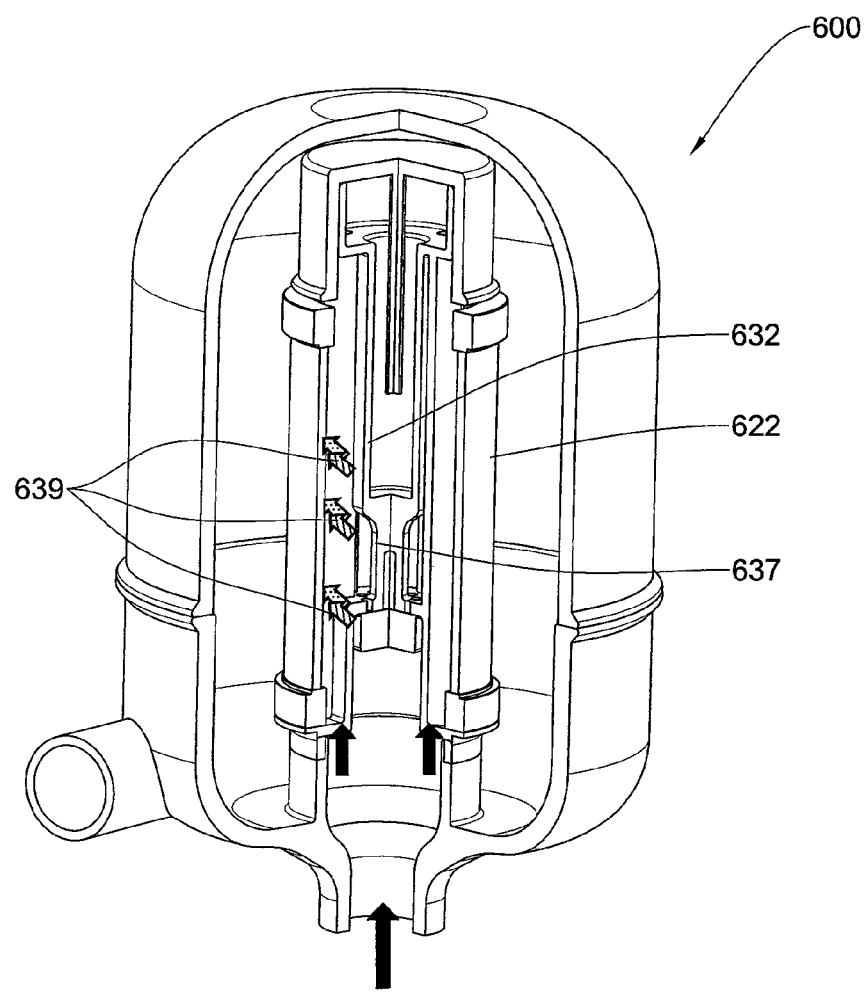
FIG. 6B illustrates the assembly of FIG. 6A at a rinsing state thereof, with propelling motion imparted by fluid jets.

With further attention now be made to FIGS. 6A and 6B there is illustrated yet another example of a filter assembly in accordance with the present invention generally designated 600.

In this example, which is principally similar to that disclosed in the example of FIGS. 5A and 5B, the filtering unit 622 revolves by the provision of jet generating nozzles 637 directed against the filtering unit 622 and configured for generating a vector of force in a substantial radial direction for cleaning and a vector of force in a substantial tangent direction, whereby the rinsing fluid (hatched arrows) is tangentially emitted from said nozzles 637 indirection of arrows 639 (FIG. 6B), as a result of which the filtering unit 622 revolves about its longitudinal axis.

FIG. 7 of the drawings illustrates a different example of a filter assembly in accordance with the present disclosed subject matter generally designated 700 and comprising a housing 704 configured near its bottom with an inlet port 716 connectable to a source of raw fluid supply (not shown).

The housing 704 comprises an outlet port 776 with an annular, coaxially extending combined rinsing fluid inlet port 780 and propulsion fluid inlet port 782.

A filter unit generally designated 720 is fixedly received within the housing 704 and comprises a central support 735 supporting a cylindrical thread-type filter unit 721 extending coaxially within a stack of filtering disks 723 compacted and pressed by a top mount 739 compacting the filtering unit and support it in place over a central support 758 extending from a lower portion of the housing 704 extending from the outlet port 776 and being in flow communications therewith.

A space 731 extending between the stack of filtering disks 723 and the cylindrical thread-type filter 721 accommodates a pair of rinsing columns 760, each configured with a plurality of gat emitting nozzles 764 extending along the filter unit 720 and opposite the stack of filtering disks 723 and the thread-type cylindrical filter 721. However, it is appreciated that there may be one or more rinsing columns.

Furthermore, the central support column 735 comprises a plurality of rinsing nozzles 767 facing the internal surface 769 of the thread-type filter 721 for rinsing thereof.

A filtering process takes place by introducing raw fluid in direction of hollowed arrows 770 through the inlet port 716 into the space 702 of the filter assembly 700 whereby the raw fluid passes through a first filtering stage namely the stack of filtering disks 723 into the intermediate space 731 and then is further filtered by the thread-type cylindrical filter 721, wherein the filtered fluid then flows in direction of arrows 791 into the outlet chamber 799 and then out through the outlet port 776.

When it is now desired to rinse the filter assembly 700, the raw fluid supply is disconnected and rinsing fluid (hatched arrows 780) which serves also as propulsion fluid (dotted arrows 782) are now forced through the port into the intermediate rinsing chamber 789, wherein the fluid jets tangentially impinging against (or at least having tangentially directed vectors) the filtering unit 720 result in revolving of the filtering unit 720. Rinsing fluid (hatched arrows 782) emitted through the nozzles 764 and apertures 767 of the central hubs 735 simultaneously rinse the stack of filtering disks 723 and the thread-type filter 721. The tangentially directed fluid jets extend all or a portion of the length of the filtering unit 720. It is also an option that several nozzles are so directed so as to generate a tangential vector for generating revolving force and other nozzles are directed for rinsing the filtering unit 720. The rinsing fluid and dirt may then be drained through the inlet port 716 upon disconnecting it from the supply of raw fluid.

Figure 7A:
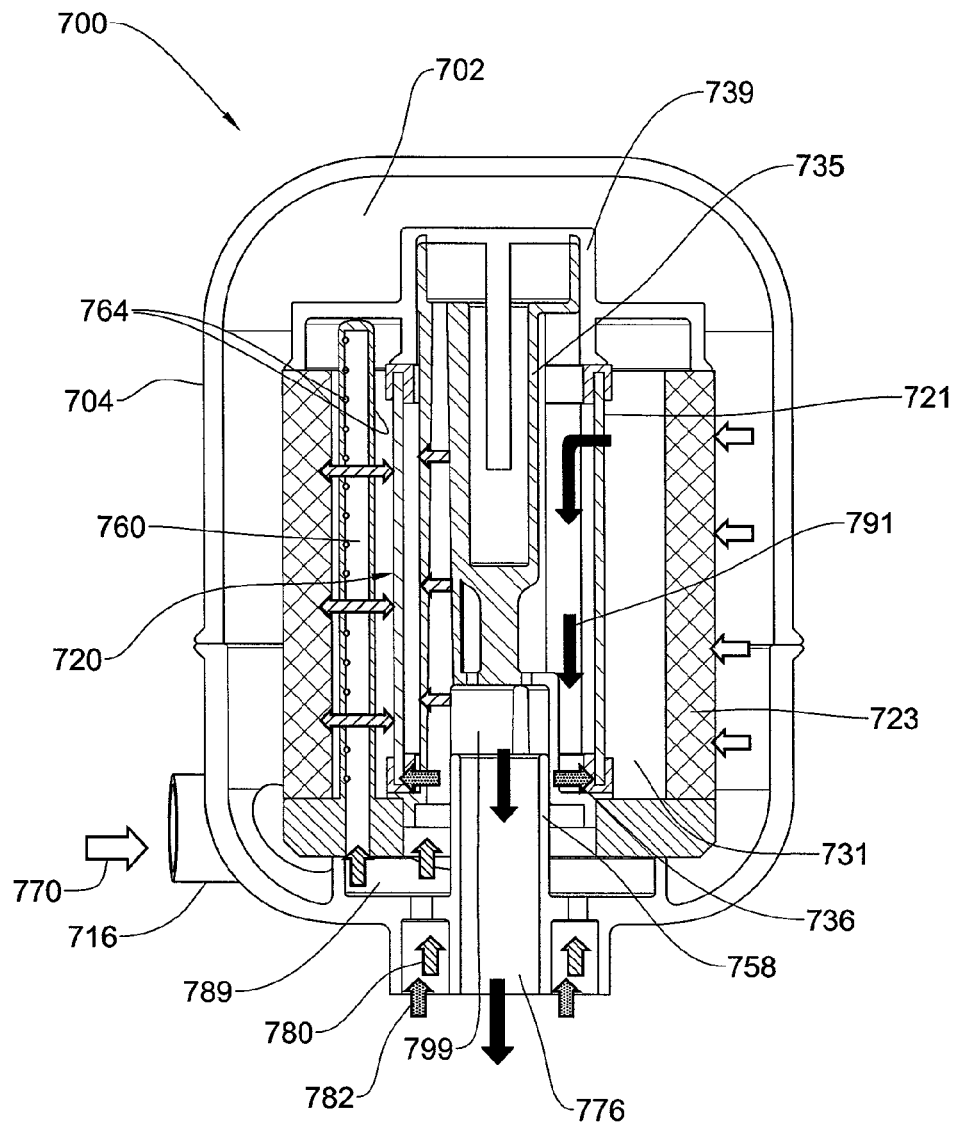
FIG. 7A is an isometric view, partially cutout, of a filter assembly wherein the filter unit is a multistage assembly comprising a stack of filtering disks and a thread cylinder.
Figure 7B:
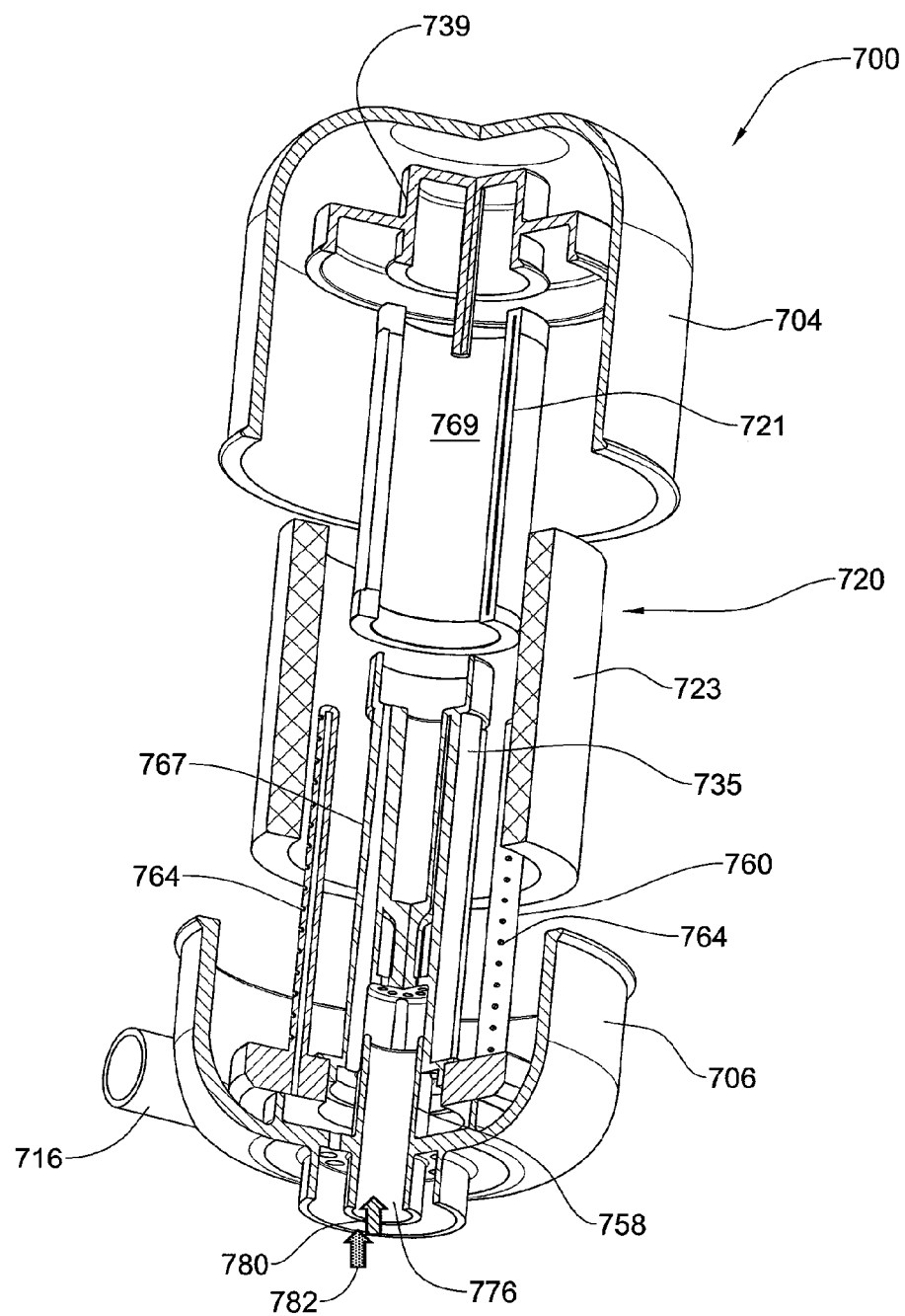
FIG. 7B is a partially exploded view of FIG. 7A.
Figure 8A:
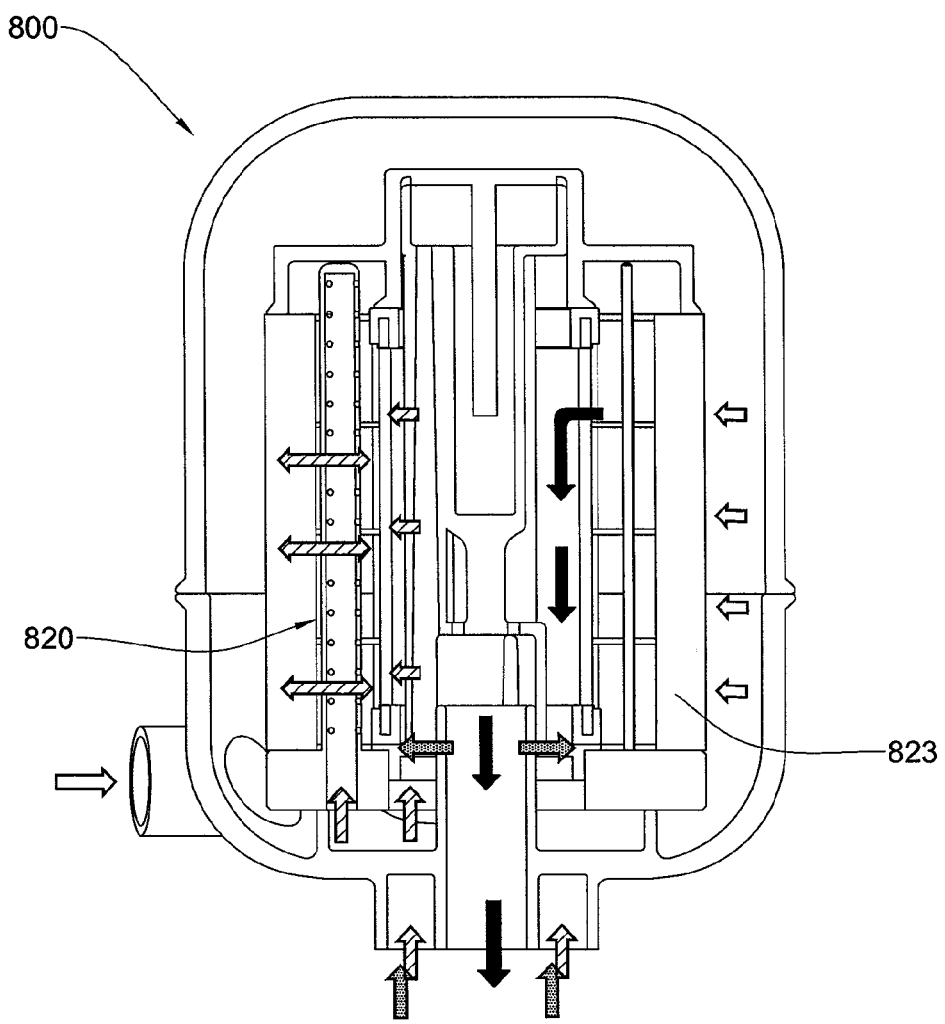
FIG. 8A is an isometric view, partially cutout, of a filter assembly wherein the filtering unit is a multistage unit comprising a filter screen and a thread cylinder.
Figure 8B:
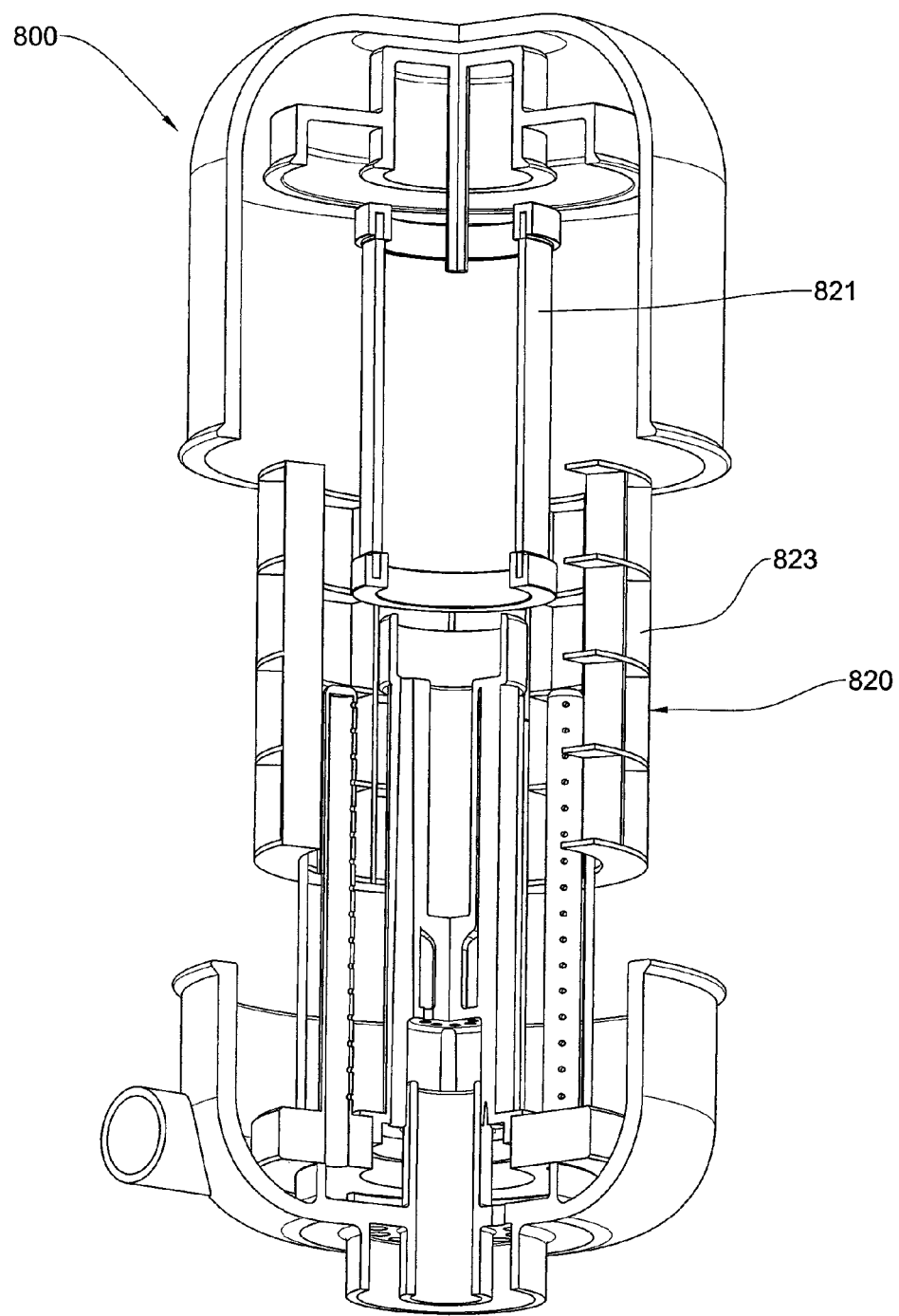
FIG. 8B is a partially exploded view of FIG. 8A.

Turning now to FIGS. 8A and 8B there is illustrated a filter assembly generally designated 800 being substantially similar to that disclosed in connection with the filtering assembly 700 illustrated in connection with FIGS. 7A and 7B. The principle difference residing in that the filter unit generally designated 820 is a two-stage filter unit comprising as a first filtering stage configured as a filter mash (screen of material such as plastic, steel, and the like, supported by a rigid, reinforced skeleton-like structure) designated 823, coaxially mounted over a cylindrical thread-type cylindrical filter 821 serving as a second stage filter.

Filtering through the filter assembly 800 and its rinsing take place in a similar fashion as disclosed in connection with FIGS. 7A and 7B.

Figure 9:
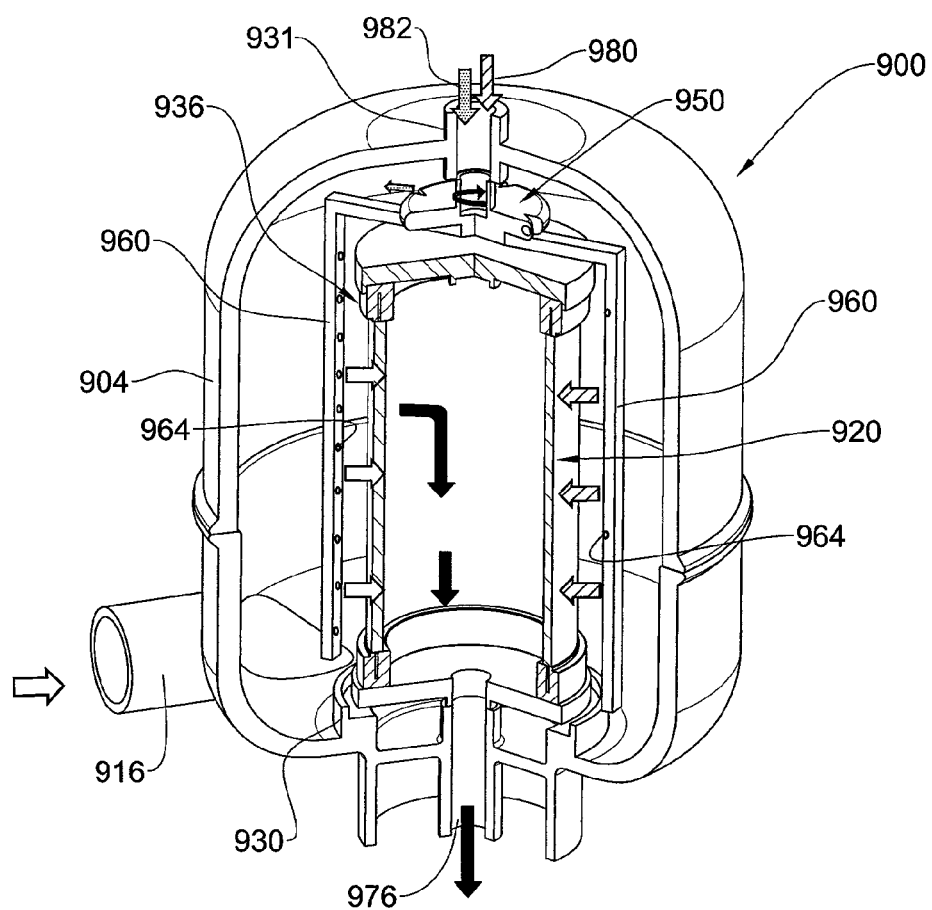
FIG. 9 is an isometric view, partially cutout, of a filter assembly fitted with a static filter unit and a hydraulic cleaning unit revolving externally over said filter unit.

FIG. 9 is directed to a modification of a filtering assembly in accordance with the disclosed subject matter generally designated 900.

The principles of operation of the filter assembly 900 resemble in a way those of the configuration illustrated in connection with FIG. 2 of the drawings, namely wherein filteration takes place radially inwards about the filtering unit 920 and the rinsing process takes place in the same direction by means of a cleaning unit 950 comprising a rotatable sprinkler configured with a plurality of rinsing jets and being rotatable about the external surface 928 of the filter unit 920.

The housing 904 is fitted with an inlet port 916 and a filtered fluid outlet port at 976. Rinsing fluid 980 and propulsion fluid 982 are introduced through a uniform inlet port 931 configured at a top of the housing 904, said inlet extending through a hydraulic turbine 936 towards the two sprinkler arms 960 extending axially and spanning the entire length of the filtering unit 920 wherein the sprinkler arms 960 are configured with a plurality of jet nozzles 964 directed against the external surface 928 of the filter unit 920 (which in the particular example is a thread-type cylindrical filter though, as discussed hereinbefore, may be any other type of filtering media).

The rinsing fluid 980 flows through the turbine 936 giving rise to generation of revolutionary forces to the sprinkler arms 960, said fluid then continues to the nozzles 964 with jets emitted for cleaning the filtering media 920. The dirty water during a rinsing process may be drained from the filter assembly through the inlet port 916 dirt and any other contaminating matter with some of the rinsing fluid draining through the outlet port 976.

As can further be seen in FIG. 9, the filter unit 920 is fixedly supported within the housing 904 by means of a support bracket 930 integrally extending from a bottom surface of the housing 904 rigidly supporting the filter unit 920.

Whilst in the examples discussed hereinbefore, the cleaning process takes place by revolution of one or both of the filtering unit and a cleaning unit, in the examples illustrated hereinafter in connection with FIGS. 10-13 cleaning/rinsing takes place by applying also axial displacement of one (or both) of the filter unit and cleaning unit.

Figure 10:
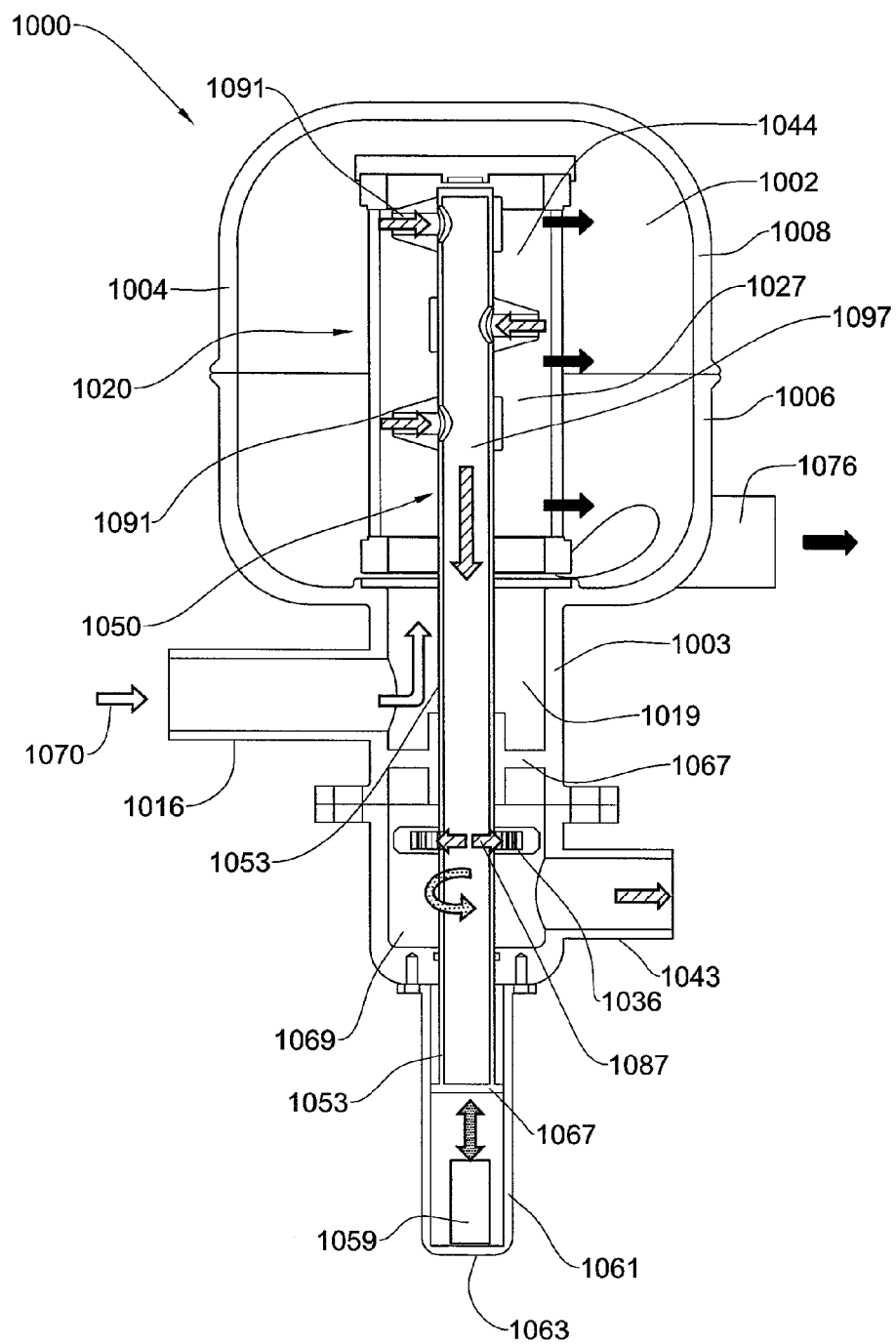
FIG. 10 is an isometric view, partially cutout, of a filter assembly fitted with a static filter unit and an internal cleaning unit fitted with a plurality of suction nozzles displaceable about the filter unit.

With reference being made first to FIG. 10, there is illustrated a filter assembly generally designated 1000 comprising a housing 1004 configured of a bottom portion 1006 fixedly secured to a top portion 1008 and defining together an internal space 1002. Extending from the bottom portion 1006 there is a downward hub 1003 a raw fluid inlet port 1016 extending into an inlet chamber 1019. Extending from the space 1002 of the filter housing 1004 there is provided an outlet port 1076.

Fixedly supported within the housing 1004 there is a cylindrical filter unit 1020 which may be any sort of filtering media though in the particular example a thread-type cylindrical filter is illustrate. The filter 1020 is secured within the housing 1004 defining an internal filtering space designated 1044.

Supported by the hub 1003 there is a cleaning unit assembly generally designated 1050 comprising a cylindrical rod 1053 supported within the hub 1003 and configured for combined rotational displacement and axial reciprocal displacement about the longitudinal axis thereof by means of a hydraulic turbine 1036. It is noticed that a lowermost end of the stem 1053 is coupled to a hydraulic piston 1059 (received within a partitioned compartment 1061 dead-end of tubular section 1063) for imparting reciprocal axial displacement to the stem 1053. The hub 1003 is partitioned by a wall 1067 giving rise to a lower chamber 1069 in which the turbine 1036 is provided.

As can be seen in the drawings, the top chamber 1019 is in direct flow communication with the internal space 1044 of the filter unit 1020 and the hollow stem 1053 is fitted with a plurality of suction nipples 1091 extending in close proximity with an internal surface 1027 of the filter unit 1020 wherein the suction nipples 1091 are in flow communication with the internal volume 1097 of the hub 1053 which in turn is in flow communication with the turbine 1036 by openings 1087. The lower chamber 1069 is in flow communication with a rinsing fluid outlet port 1043.

In use, during a filtering stage of the filter assembly 1000, raw fluid (hollowed arrows) 1070 enters the system through the inlet port 1016 and then flows through the inlet chamber 1019 into the internal space 1044 of the filter unit 1020. The raw fluid is then forced through the filter unit 1020 wherein the filtered fluid (solid arrows) flows out into the space 1002 and then out through outlet port 1076 to be consumed.

During a rinsing process suction is applied through the rinsing fluid outlet port 1043, wherein rinsing fluid (hatched arrows)/propulsion fluid (dotted arrows) is sucked through the suction nipples 1091 towards the hydraulic turbine 1087 and where reciprocal axial displacement of the central stem 1053 takes place side by side with the rotary motion thereof, whereupon the suction nipples 1091 travel about the internal surface 1027 of the filtering media 1020 cleaning and removing dirt and undesired material therefrom. The rinsing fluid flows through the space 1097 of the central hub 1053 and then out through the rinsing fluid outlet port 1043 directly to the atmosphere or to a dedicated reservoir.

Figure 11:
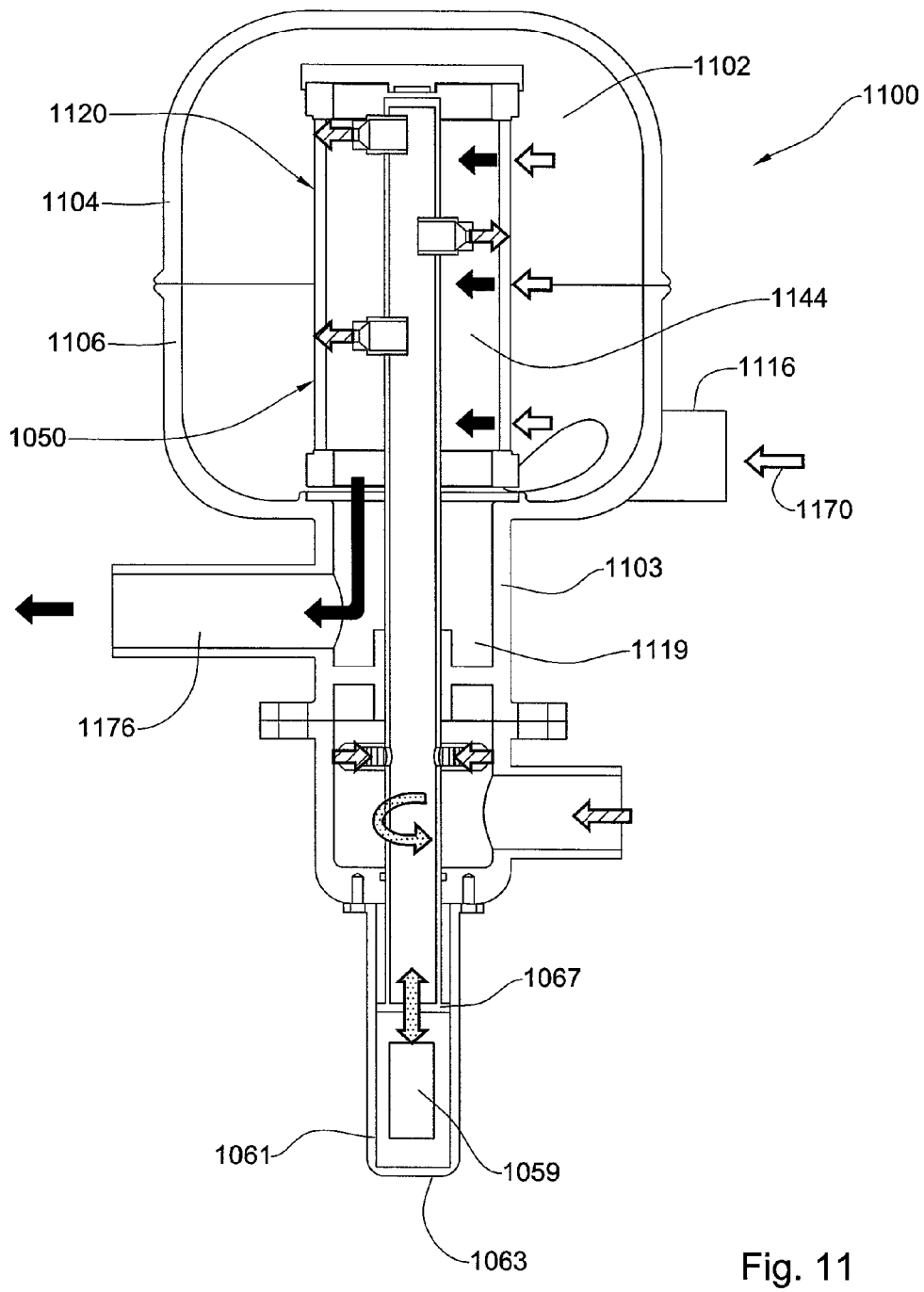
FIG. 11 is an isometric view, partially cutout, of a filter assembly fitted with a static filter unit and an internal cleaning unit fitted with a plurality of jet emitting nozzles.

The example illustrated in FIG. 11 resembles that illustrated in connection with FIG. 10 in its structure, configuration and its rinsing/cleaning mode. However, contrary to the previous example, in the embodiment of FIG. 11, the filter assembly 1100 has a raw fluid inlet port 1116 extending directly into a lower portion 1106 of the housing 1104 namely into the space 1102 of the filter assembly 1100. The filtered fluid outlet port 1176 extends from the downward extending support 1103 wherein the chamber 1119 is in flow communication with the inside space 1144 of the filter unit 1120.

Accordingly, a filtering process takes place by introducing raw fluid (hollowed arrows) 1170 through the inlet port 1116, said raw fluid flowing into the space 1102 and then forced through the filter unit 1120 wherein the filtered fluid (solid arrows) enters the space 1144 and then drains downward through chamber 1119 and out through the outlet port 1176.

The rinsing/cleaning assembly 1150 is identical with that disclosed in connection with the example of FIG. 10 and attention is directed to the explanation and disclosure made with reference to FIG. 10. Thus, an external source of rinsing fluid is required.

Figure 12A:
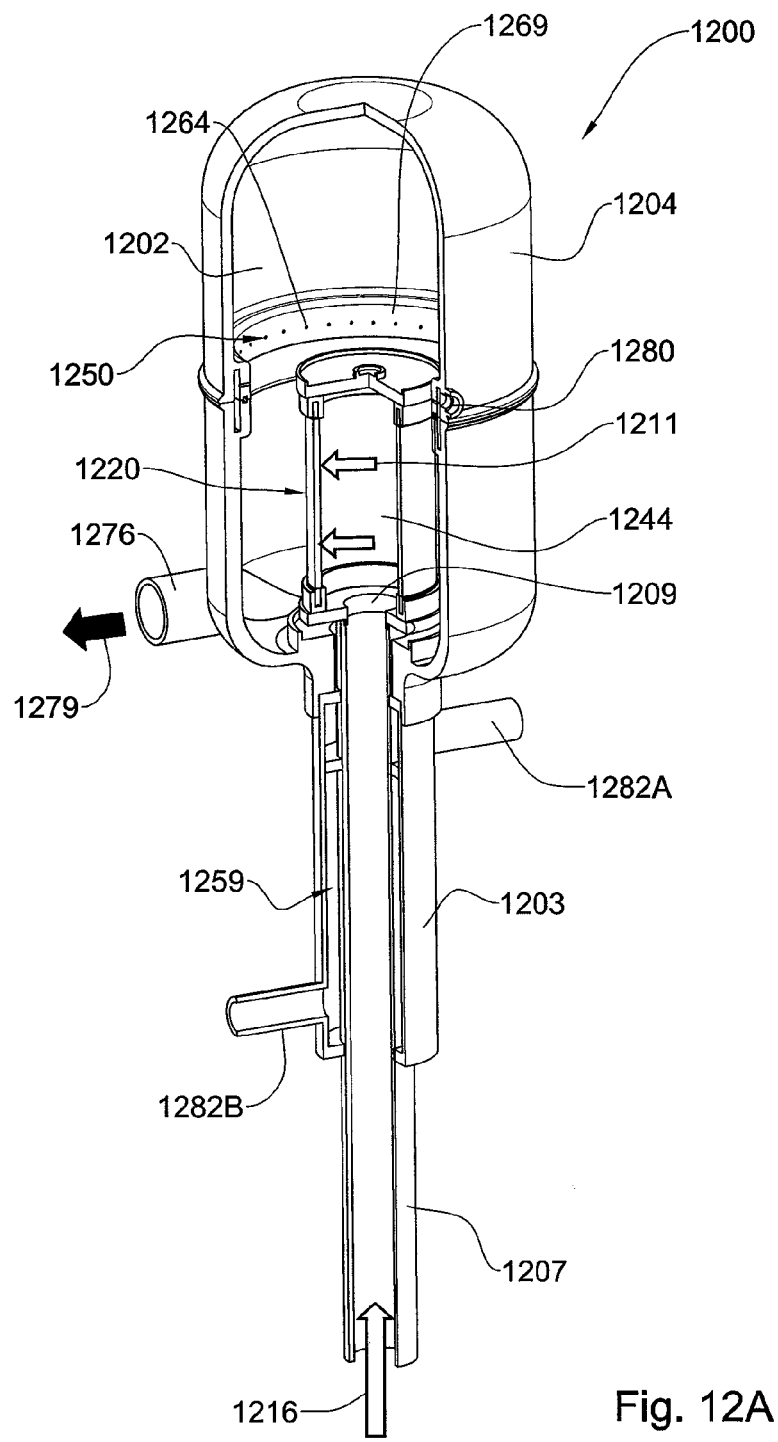
FIG. 12A illustrates a filtering state.

Yet another example is illustrated in connection with FIGS. 12A and 12B. In accordance with this example, there is provided a filter assembly generally designated 1200 comprising a housing 1204 fitted with a filtered fluid outlet port 1276. A filter unit generally designated 1220 is axially displaceable within the space 1202 of the housing 1204 whilst a rinsing/cleaning assembly 1250 is stationary secured within the housing 1204, the operation of which will be discussed hereinafter.

Extending downwardly from the housing 1204 there is a sleeve 1203 accommodating a raw fluid supply tube 1207 configured with a raw fluid inlet port at 1216, said tube 1207 being a rigid hollow stem extending through a port 1209 into the internal space 1244 of the filter unit 1220. Thus, it is appreciated that filtration process takes place by applying the raw fluid through the filter unit 1220 radially outward in direction of arrows 1211 wherein the filtered fluid 1279 flows out through the filtered fluid outlet port 1276. The cleaning/rinsing unit 1250 comprises a nozzle supporting ring 1269 secured to the inner wall of the housing 1204 and provided with a plurality of jet nozzles 1264 radially facing inwardly, and being in flow communication with a rinsing fluid inlet port 1280 fitted on an outer surface of the housing 1204.

A propulsion unit comprises a hydraulic piston designated 1259 fitted with a pair of propulsion inlet/outlet propulsion fluid ports 1282A and 1282B for imparting the hollow stem 1207 with reciprocal axial displacement about a longitudinal axis of the assembly.

Figure 12B:
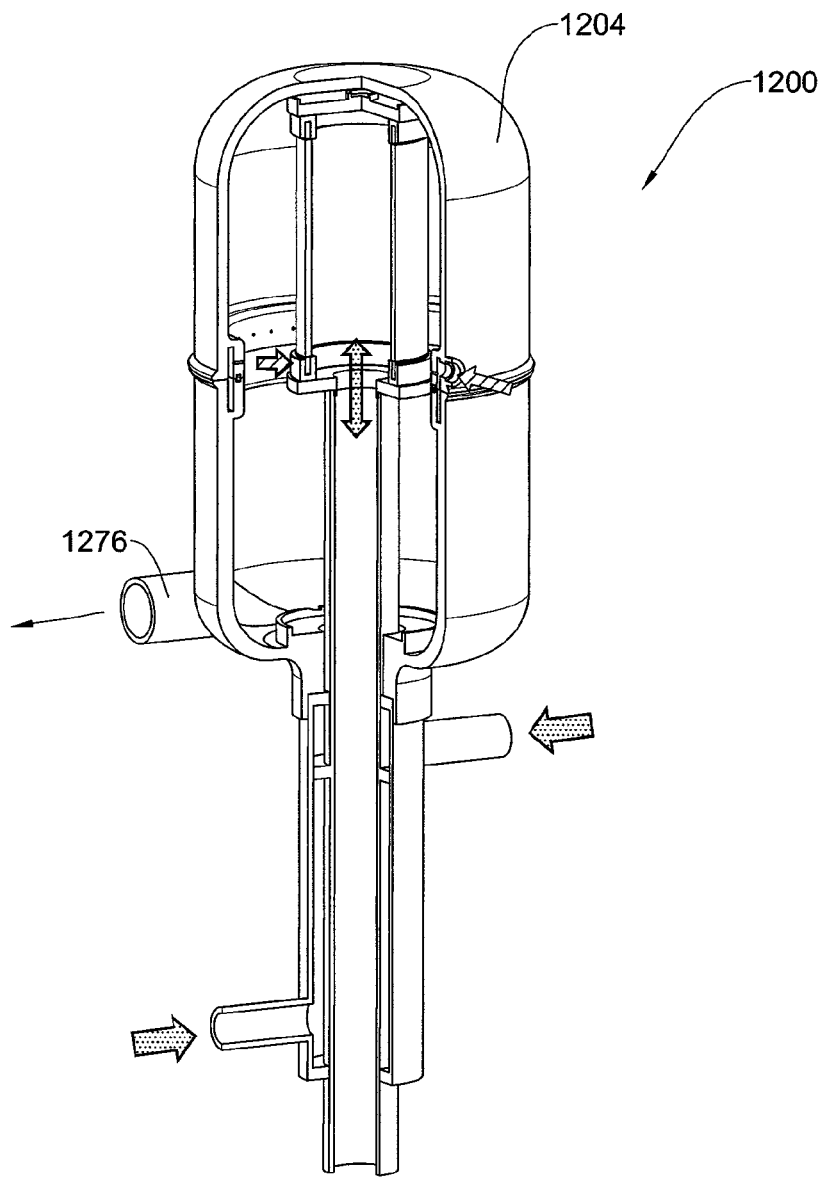
FIG. 12B illustrates a rinsing state.

In a cleaning/rinsing process rinsing fluid is pressurized through the rinsing fluid inlet port 1280 resulting in jets of rinsing fluid emitted through the nozzles 1264 radially inwardly directed propulsion fluid introduced periodically through the propulsion fluid ports 1282A and 1282B causes the rod 1207 to axially reciprocate resulting in turn in axial displacement of the filter unit 1220 such that the jets of rinsing fluid emitted from the nozzles 1264 apply rinsing jets substantially about the external surface 1228 of the filter unit 1220, whereby the rinsing fluid and dirt may then be drained through the outlet port 1276 and 1216 (FIG. 12B).

Figure 13A:
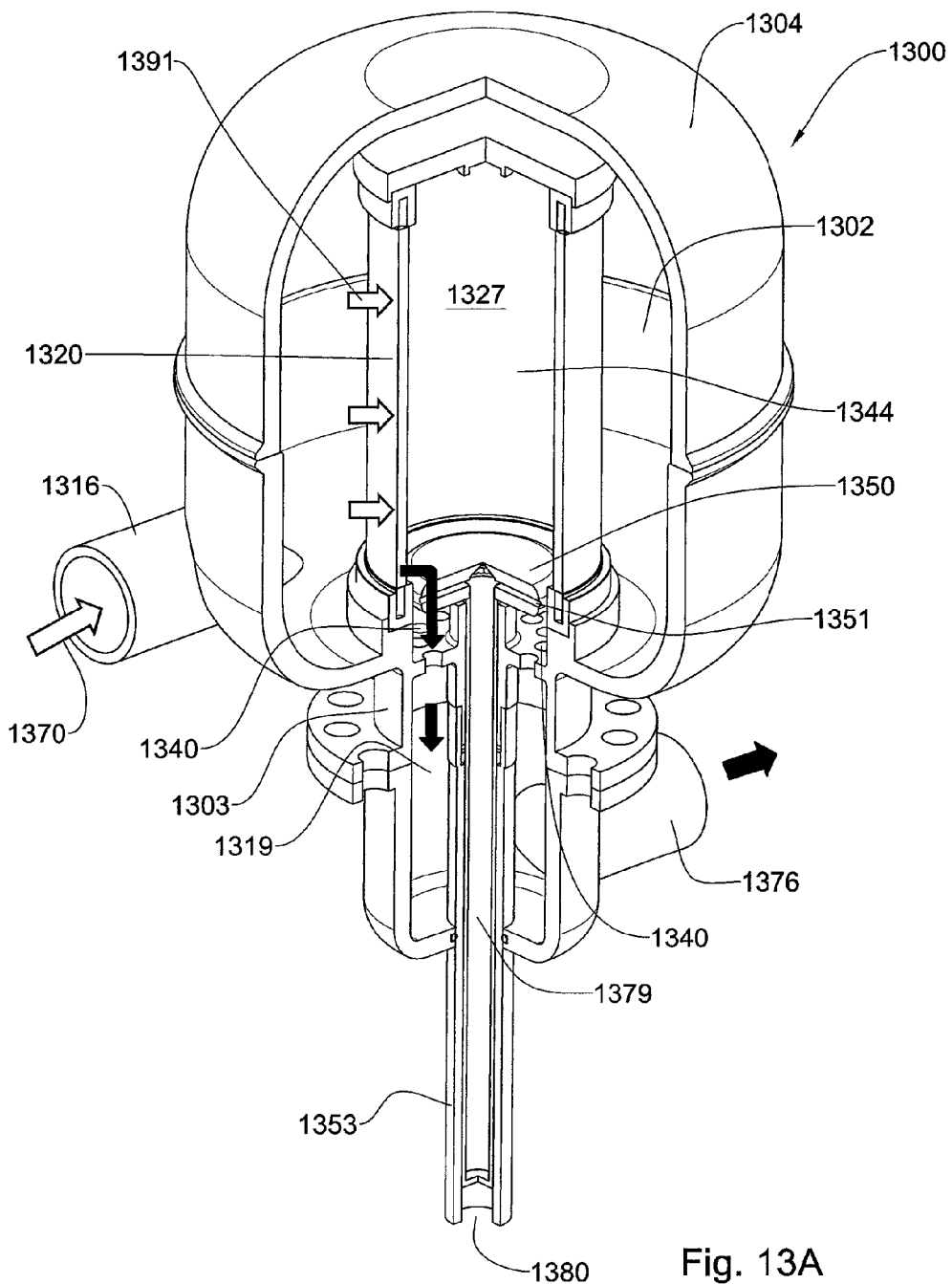
FIG. 13A illustrates a filtering state.
Figure 13B:
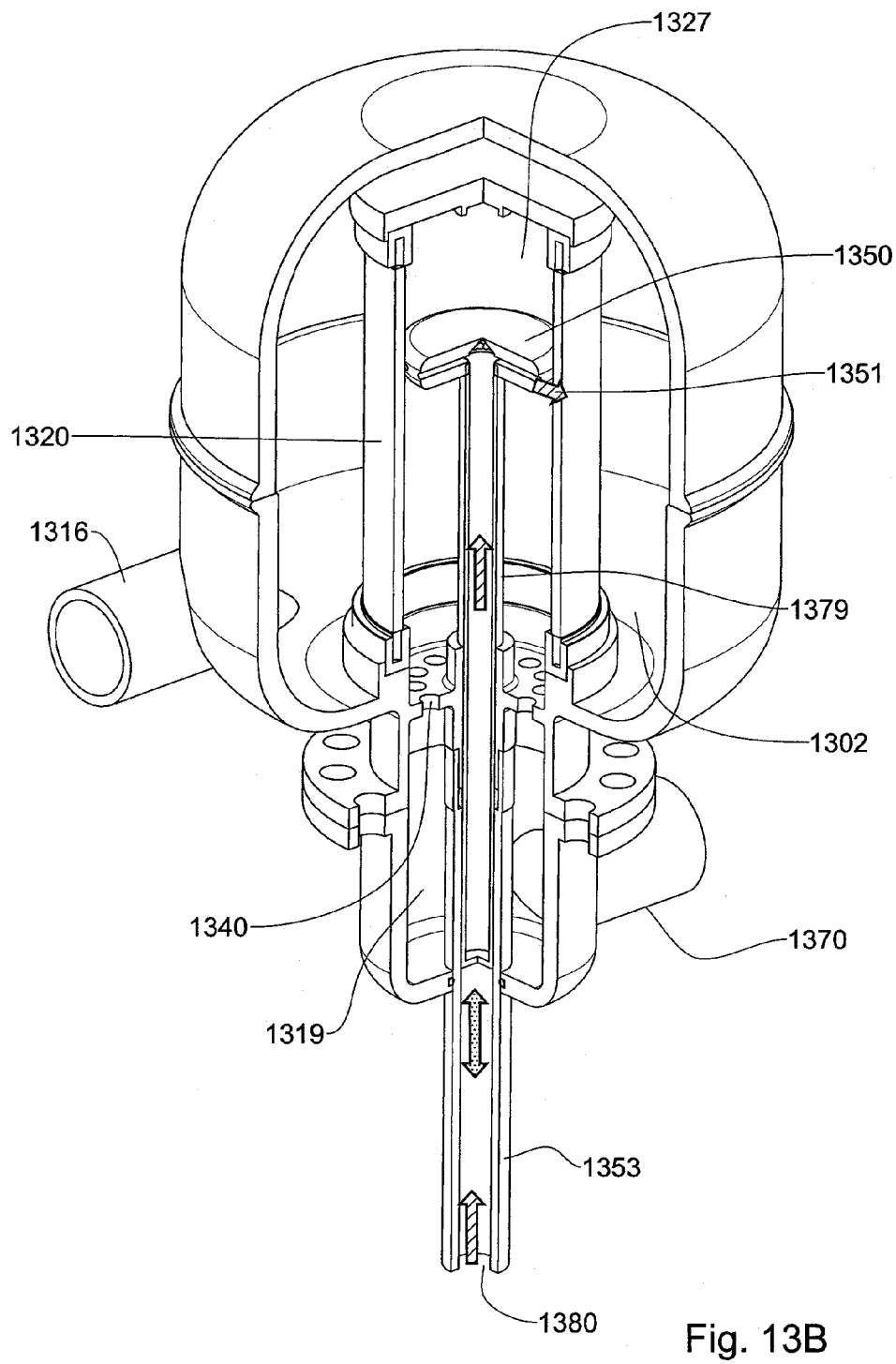
FIG. 13B illustrates a rinsing state.

Turning now to the example illustrated in FIGS. 13A and 13B there is illustrated a filtering assembly designated 1300 comprising a housing 1304 fitted with an inlet port 1316 extending into the inside space 1302 of the filter assembly 1304.

A filter unit generally designated 1320 is fixedly secured within the housing 1304 and is configured for filtering fluid in a radially inward direction as represented by arrows 1391 and as will be discussed hereinafter.

Extending downwardly from the housing 1304 there is a support hub 1303 defining an outflow chamber 1319 which is in flow communication with the inside space 1344 of the filtering unit 1320 via a plurality of apertures 1340, which chamber 1319 extends to the filtered fluid outlet port 1376.

Received within the support hub 1303 is a rinsing/propulsion hollow tube 1353 fitted with a combined rinsing fluid inlet and propulsion fluid inlet 1380.

Received within the fixed stem 1353 and axially displaceable therewithin in a reciprocal manner there is a rinsing rod 1379 being in flow communication with the rinsing fluid inlet port 1380, with a rinsing plate 1350 fitted at its top end and configured with a plurality of radially extending rinsing nozzles 1351 extending in close proximity to the internal surface 1327 of the filter unit 1320.

During a filtering process (FIG. 13A) raw fluid 1370 is introduced through inlet port 1316 into the space 1302 upon which it is forced through the filter unit 1320, into the internal space 1344 and then admitted out through the apertures 1340, into intermediate chamber 1319 and out through the filtered fluid outlet port 1376.

In the rinsing/cleaning stage, as illustrated in FIG. 13B, rinsing/propulsion fluid is introduced through the combined rinsing fluid/propulsion fluid inlet 1380 of the stem 1353 resulting in upward displacement of the rod 1379 and its articulated cleaning disk 1350 whilst the rinsing fluid entering through the nozzles 1351 applies cleaning jets against the inside surface 1327 of the filter unit 1320. Reciprocal axial displacement of the cleaning unit 1350 is obtained by a hydraulic piston (not shown), however the operation of which being self-explanatory for imparting reciprocal axial displacement of the cleaning unit. The rinsed fluid with the dirt and contaminating particles may then drain through the openings 1340 into the space 1319 and then out through the port 1376 whilst fluid residing in the space 1302 may be drained through the port 1316.

Turning now to FIGS. 14-20 there are illustrated several examples of configuration of thread-type filtering cylinders configured with a tensioning/loosening mechanism. Such a mechanism is required in order to convert the thread-type filtering cylinder between a filtering mode and a rinsing mode. It is desired that during a filtering mode the threads of a thread-type filtering cylinder extend tensioned substantially reducing or eliminating slack of the thread to thereby improve the filtering capacity of the filter cylinder so as to entrap fine particles of material. However, at a rinsing state, it is desired to slack, to a certain extent, the threads of a thread-type filter unit to facilitate rinsing fluid to remove the dirt collected on and between the threads during the filtering process. However, it is desired that during the rinsing process the threads maintain their order and that upon re-tensioning of the threads, into the filtering mode, the threads are kept in order so as to maintain the filtering parameters of the thread-type filtering cylinder.

For sake of simplicity, in the following figures (namely FIGS. 14-20 directed to the thread/loosening mechanism) the threads are not illustrated.

Turning first to FIGS. 14A-14F there is illustrated a thread-type spindle generally designated 1500 is illustrated and comprises a cylindrical hub 1510 formed of a substantially rigid material (e.g. polymers, metal, etc.) and configured with a plurality of throughgoing apertures 1514 extending substantially in a radial direction between the external surface 1518 of the hub 1510 and its inner surface 1520. The hub 1510 is supported between a top bracket 1526 and a bottom bracket 1528 which in turn are provided with a sealing ring 1532 used for sealing engagement with a filter unit support/arresting element of the filter assembly (not shown). The throughgoing apertures 1514 facilitate for fluid flow of fluid during filtration process and rinsing process.

A plurality of fixed support rods 1540 axially extend and are fixedly secured at their respective ends to the top bracket 1526 and bottom bracket 1528, wherein the fixed support rods are substantially equi-radially and equi-angularly disposed about a longitudinal central axis X of the filter cylinder 1500.

A plurality of radially displaceable tension bars 1546 are provided, each extending between a pair of neighboring support rods 1540, said tension bars 1546 configured with a rounded tip 1550, said tension bars having their tips 1550 extending substantially parallel to the longitudinal axis of the filter cylinder, though their rear end 1552 is wedge-like shaped having a narrow upper portion and widening toward the bottom.

The tension bars 1546 ride over a axial displacing member 1564 having a substantially flat inner surface 1566 and a tapering outer surface 1568 configured with a plurality of axial, tapering grooves, each slidingly accommodating a tension bar 1546, said grooves and respective tension bars being wedge-like and extend at an opposite sense to each other.

The arrangement is such that axial displacement of the axial displacing member 1564 entails corresponding radial displacement of the tension bars 1546 between a filtering state (FIGS. 14A, 14B and 14C) wherein the tension bars 1546 radially project slightly between neighboring support rods 1540, resulting that a cord of thread 1570 extending between two neighboring support rods 1540 is now divided into two cords 1572A and 1572B, thus increasing the overall diameter of the wound filtering thread and tensioning it. This is obtained by axially displacing the axial displacing member 1564 axially in direction of arrow 1580 (FIG. 14A) against the axially supported tension bars 1546.

When it is now desired to shift the thread-type filter cylinder 1500 into the rinsing mode (FIGS. 14A, 14D, and 14E) the displacing member 1564 is displaced in direction of arrow 1582 (FIG. 14D) resulting in retraction of the tension bars 1546, as a result of which the tips 1540 disengage from the cord of thread 1570, thus reducing tension and allowing some slack between the threads of the thread-type filter cylinder.

A different configuration of a thread-type filter cylinder tensioning/loosening mechanism is illustrated in FIGS. 15A-15F, generally designated 1600 and comprises a hub composed of a plurality of sectorial segments 1602 each configured with a slanted top and bottom inside surface 1606 and further each provided with a plurality of thread-type placing ridges 1610 wherein the filtering threads are wound over and between the ridges 1610 so as to prevent them from axial displacement about the sectorial segments 1602. Between two adjoining ridges 1610 there extends a valley 1612, said valleys provided with an opening 1616 to facilitate fluid flow into the central space 1620 of the thread-type filter cylinder 1600. The filtering threads are coiled about the filter cylinder in manner such that they do not radially project beyond the ridges 1610.

Each of the sectorial segments 1602 is radially displaceable, to a limited extent and the arrangement is such that the plurality of sectorial segments 1602 constitute together the cylindrical shape of the filter cylinder spindle as can be seen in FIG. 15A. The sectorial segments 1602 are supported at their respective top and bottom ends by conical cap members 1670 serving also as the axial displacing members wherein said conical cap members 1670 taper at their edge substantially equally as the inclined surfaces 1606 of the sectorial members 1602.

At the filtering mode of the filter cylinder 1600 of FIGS. 15B and 15C, the conical cap members 1670 are axially displaced towards one another in direction of arrows 1678 resulting in radial outward displacement of the sectorial segments 1602 in direction of arrows 1680 (FIG. 15C) thus, tensioning the filtering thread (not shown). In this position the filtered fluid may be flown through the filtering threads with the openings 1616 facilitating for fluid flow of the filtered fluid.

Figure 15D:
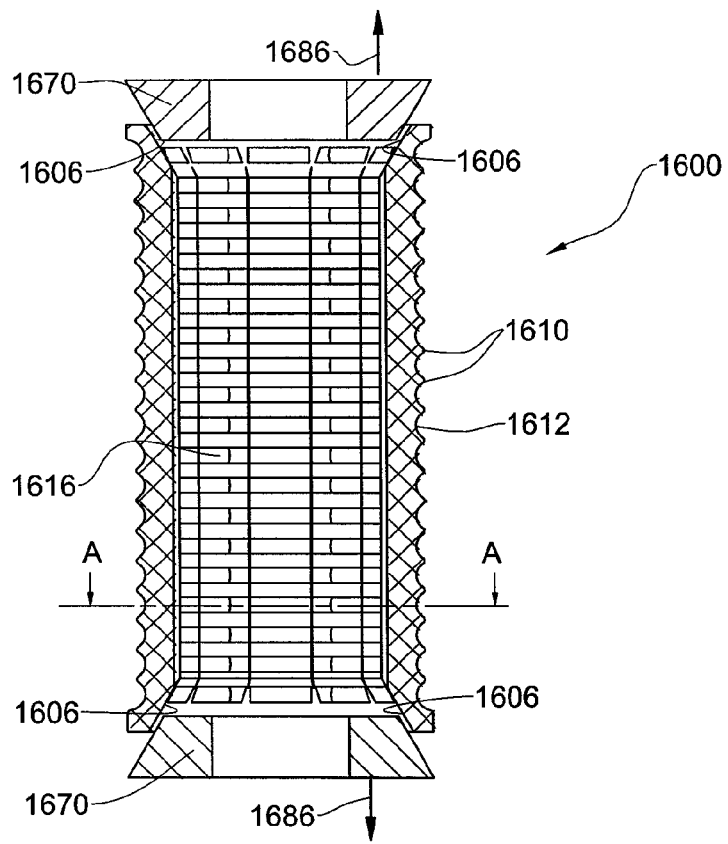
Figure 15E:
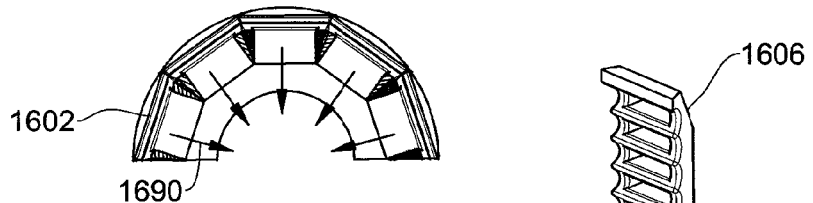
Figure 15F:
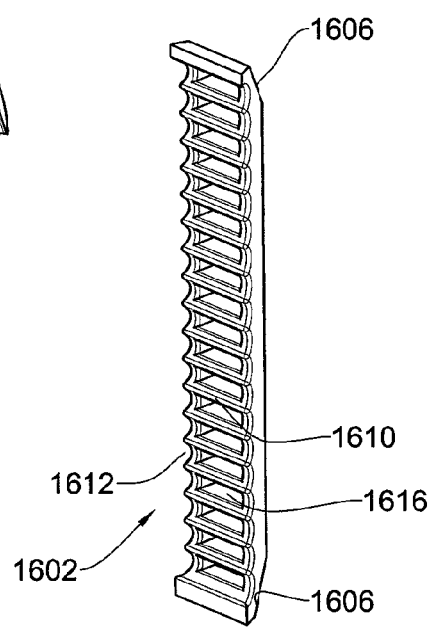
Figure 19D:
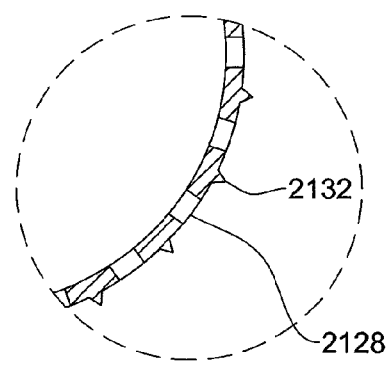
FIGS. 19A to 19D are still a modification of a thread-type filter cylinder support seen for example in FIG. 17.
Figure 19C:
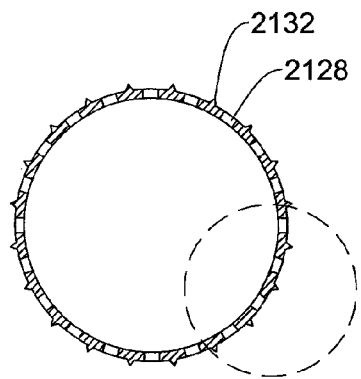
Figure 19A:
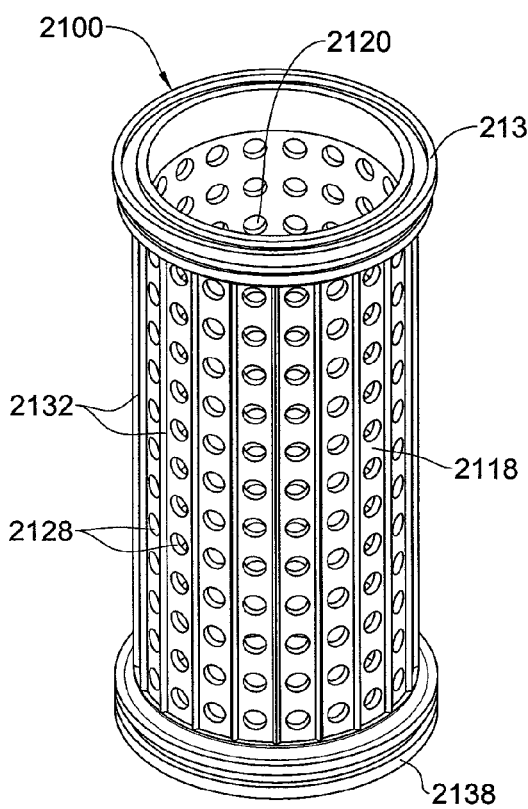
Figure 19B:
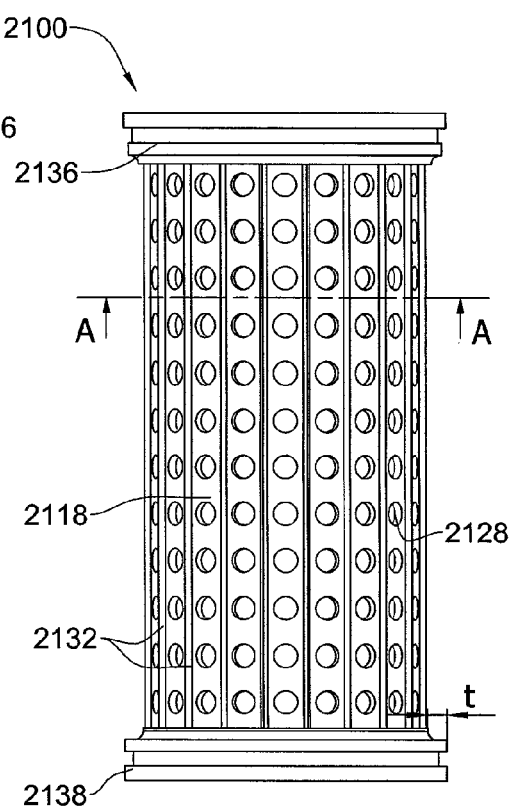

Turning now to the cleaning mode as illustrated in FIGS. 15D and 15E, the conical cap members 1670 are displaced away from one another in direction of arrows 1686 resulting in contraction of the sectorial segments 1602 in direction of arrows 1690 (FIG. 15E) thus allowing some slack of the filtering threads to facilitate rinsing/cleaning thereof, as discussed hereinabove in connection with previous examples. FIG. 15 F illustrates sectorial segments 1602.

Further attention is now directed to FIGS. 16A-16F illustrating a modification of the tensioning/loosening mechanism discussed in connection with the configuration of FIGS. 14A-14F.

In accordance with the example of FIG. 16, the thread-type filter cylinder generally designated 1700 comprises a plurality of coaxially extending fixed support rods 1740 equi-distantly spaced from one another as can be seen in particular in FIGS. 16B and 16E. The support rods 1740 remain fixed in place by virtue of a top bracket 1726 and a bottom bracket 1728 which in turn are configured for being fixedly and sealingly received within the filter assembly (not shown) wherein the thread-type filter threads (not shown) are wound about the support rods 1740 however to an extent that they do not project beyond the perimeter of the top and bottom brackets.

Rotatably received within the spindle there is a tensioning cylinder 1764 coaxially received within the thread-type filter cylinder 1700 and being angularly displaceable between a tensioned, filtering position (FIGS. 16A-16B and 16C) and a slack, loose position namely a rinsing position (as illustrated in FIGS. 16B, 16E and 16F) wherein the angular displacement of the tensioning cylinder 1764 is approximately half the angular distance between two neighboring support rods 1740 designated by angle α.

The tension cylinder 1764 is configured with a plurality of through going apertures 1714 through which filtered fluid flows during the process of filtration and through which rinsing of the filter threads may take place, as said apertures 1714 extend into the central space 1720 of the filter cylinder.

An outer surface of the tensioning cylinder 1764 is provided with a plurality of axially extending tension bars 1746, each configured with a rounded tip 1750, said tips being radially almost equal to support rods 1740.

In the filtering position (FIGS. 16A to 16C) the filtering thread is tensioned over the support rods 1740 and the tips 1750 of the projections 1764 extend substantially intermediate between neighboring support rods 1740 such that the thread is tensioned over two cords 1772A and 1772B (FIG. 16C) thus increasing the tension of the filtering thread. However, upon angular displacement of the tensioning cylinder 1764 in direction of arrow 1759 (FIG. 16E) the tension bars displace to a position neighboring respective support rods 1740, thus giving rise to a position in which there is one major cord 1779 and one minor cord 1781 (FIG. 16F) such that the filter thread is now slack over the support rods 1740.

Tensioning the filtering thread back into the filtering mode takes place by rotation of the tensioning cylinder 1764 in a direction reversed to that indicated by arrow 1759.

FIGS. 17-19 illustrate different configurations of thread-type cylinder supports which on the one hand provide adequate support of the filtering thread wound thereabout and, on the other hand, permit effective filtering therethrough and rinsing as may be required.

In the configuration of FIGS. 17A-17F there is illustrated a cylinder support (which may be referred to as a bobbin or winding hub or spindle), generally designate 1900. The cylinder support 1900 is configured of a rigid material (setting as an example plastic material, metal or any other suitable material taking into consideration strength and the environment at which the device is configured to be for use, as well as configurations of cost-effectiveness, etc.). The cylinder support 1900 comprises a cylindrical surface 1904 with a plurality of axial ribs 1908 equally distributed over the cylindrical support and extending the entire length thereof, extending under a top bracket 1912 and a bottom bracket 1914, said brackets being of a greater diameter than the cylindrical support with the radially projecting ribs 1904 wherein in use it is typical that the filtering thread (not illustrated) occupies the thickness t (FIG. 17C) namely does not project beyond the width of the top and bottom brackets. It is noticeable that the top and bottom brackets are fixed over the radially projecting ribs 1908 giving rise to a gap 1928 extending between the cylindrical surface 1904 and an inner surface 1932 of the top and bottom brackets (best seen in FIG. 17D) wherein the gap 1928 facilitates effective fluid flow in direction of arrow 1940 whereby fluid flow of filtered fluid or of rinsing fluid can easily pass at the gap (designated g at the cylindrical surface under the filtering threads, and designated 1928 between the cylindrical surface and the top and bottom brackets).

Turning now to FIGS. 18A-18D there is illustrated a cylinder support in accordance with a modification generally designated 2000 and comprising a cage-like cylindrical structure composed of a plurality of axially extending bars 2008 supported over a plurality of support rings 2012 in a rigid manner which may be obtained by injection molding, welding and the like, depending on the material of which the rigid structure of the cylinder support is manufactured. This construction gives rise to a lattice-type configuration facilitating effective fluid flow between an inside space 2020 and an outside surface of the thread-type filter. The lattice extends between a top bracket 2022 and a bottom bracket 2024, both brackets projecting radially whereby the filtering thread (not shown) is typically wound about the lattice and does not radially project from the top and bottom brackets namely does not exceed thickness t illustrated in FIG. 18B.

It is appreciated that a cylinder support 2000 of the type disclosed in connection with FIG. 18 is suitable for a thread-type filter cylinder wherein filtration and rinsing may take place in either direction i.e. radially inwardly or outwardly, whereby a flow gap extends between the innermost layer of the threads and the troth members, said gap designated g (FIG. 18D) further facilitates fluid flow of the rinsing or filtered fluid.

The configuration of FIGS. 19A-19D resembles that of FIG. 17 however, fluid flow is facilitated into the center space 2120 through a plurality of openings 2128. According to the configuration of FIG. 19 the cylindrical support 2100 comprises a cylinder configured with a substantially smooth cylindrical surface 2118 configured with said apertures 2128, and a plurality of longitudinal, axially extending ribs 2132 extending between a top bracket 2136 and a bottom bracket 2138, wherein said brackets extend radially beyond the radial dimension of the ribs 2132 such that the filtration thread (not shown) typically does not exceed the thickness t (FIG. 19B) i.e. does not radially extend beyond the diameter of the top and bottom brackets.

The structure of the cylindrical support 2100 illustrated in FIG. 19 is also of the type suitable for facilitating filtering flow and rinsing flow in either radially inward or radially outward direction.

Turning now to FIGS. 20A to 20F there is illustrated a concept of filtration assemblies according to which each filtration assembly comprises a plurality of filtering units, typically disposed in a parallel array and configured with a one or more rinsing/cleaning units according to any of the examples disclosed hereinbefore.

FIGS. 20A to 20D illustrate a first example of a filtration system generally designated 3000 comprising a housing 3002 accommodating a plurality of filtering units 3006 parallely disposed, equally distanced from a longitudinal axis X, wherein each of the filtering units is articulated to an externally disposed gear mechanism 3012 coupled in turn to a rotary motor 3014, configured for rotating each of the filtering units 3006 about its respective longitudinal axis X' (parallel to the longitudinal axis X). In the present example the rotary motor 3014 is an electrically operated mechanism, though it may just as well be hydraulically or pneumatically operated.

Similar to the previous examples, the housing 3002 is further configured with a raw fluid inlet port 3022, a flushing fluid inlet port (not seen, however coupled to a rinsing fluid supply line 3052 discussed hereinafter), a flushing fluid outlet port 3026 and a filtered fluid outlet port 3028, the later extending from a filtered fluid outlet chamber 3030.

The central rinsing/cleaning mechanism 3034 is in the form of a multi-armed, (star-like shaped) sprinkler mounted on an externally threaded central rail 3038 which in turn is coupled to the gear mechanism 3012 for imparting it rotary motion. The sprinkler 3034 is formed at its hub 3042 with an internal threading 3044 corresponding with the threading of rail 3038, whereby a plurality of longitudinally extending cords 3049 prevent the sprinkler 3034 from rotation as the central rail 3038 rotates, resulting in reciprocal axial displacement of the sprinkler 3034 about the threaded rail 3038. A reversing mechanism is provided for either reversing direction of rotation of the threaded rail 3038 each time the sprinkler 3034 reaches one of its respective ends, or a reversing mechanism is provided at the hub 3042 and the threaded rail 3038 is configured with two opposing threads, as known per se.

The arms 3046 of the central rinsing/cleaning mechanism 3034 are fitted with a jet applying nozzle 3048 at their remote ends (extending in close proximity to the external surfaces of the filtering units 3006), being in flow communication with a rinsing fluid supply line 3052 (which in the present example is a flexible hose coupled to the rinsing fluid supply port 3024).

In operation, the filtration system 3000 operates similar to the disclosure referred to in connection with the examples of FIGS. 1 to 13, however with increased filtering capacity, where each filtering unit 3006 functions according to any of the filtering modules discussed hereinabove, where the filtered fluid is directed from each filtering unit 3006 to the filtered fluid outlet port 3028, and then out through the filtered fluid outlet port 3028. When it is required to rinse the filtering units 3006, rinsing fluid is applied through the rinsing fluid inlet port 3024 resulting in jets of rinsing fluids through nozzles 3048 towards the external surface of the filtering units 3006, whilst imparting rotary motion to the central rail 3038 and to the filtering units 3006 by the gear mechanism 3012 and rotary motor 3014. As a result of the combined reciprocal axial displacement of the sprinkler 3034 and revolving of the filtering units 3006, rinsing thereof is obtained, wherein filtered fluid is then drained through filtering fluid outlet port 3026.

Figure 20A:
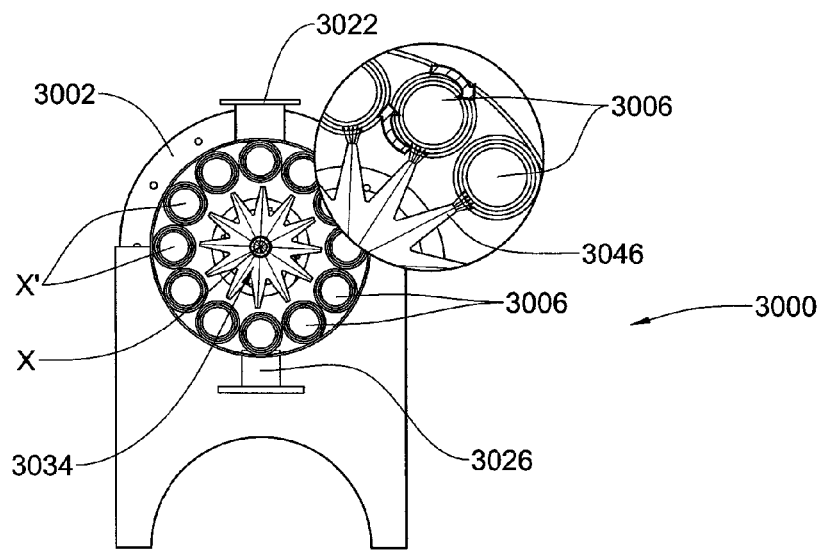
FIGS. 20A to 20F are directed to yet a configuration of a filtration assembly, according to the disclosed subject matter.
Figure 20B:
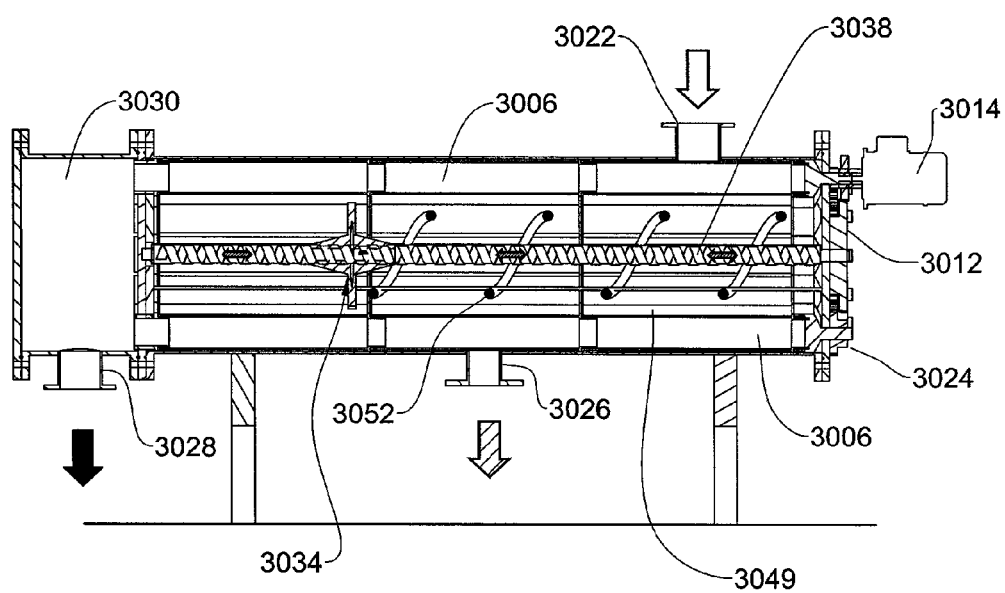
Figures 20C, 20D:
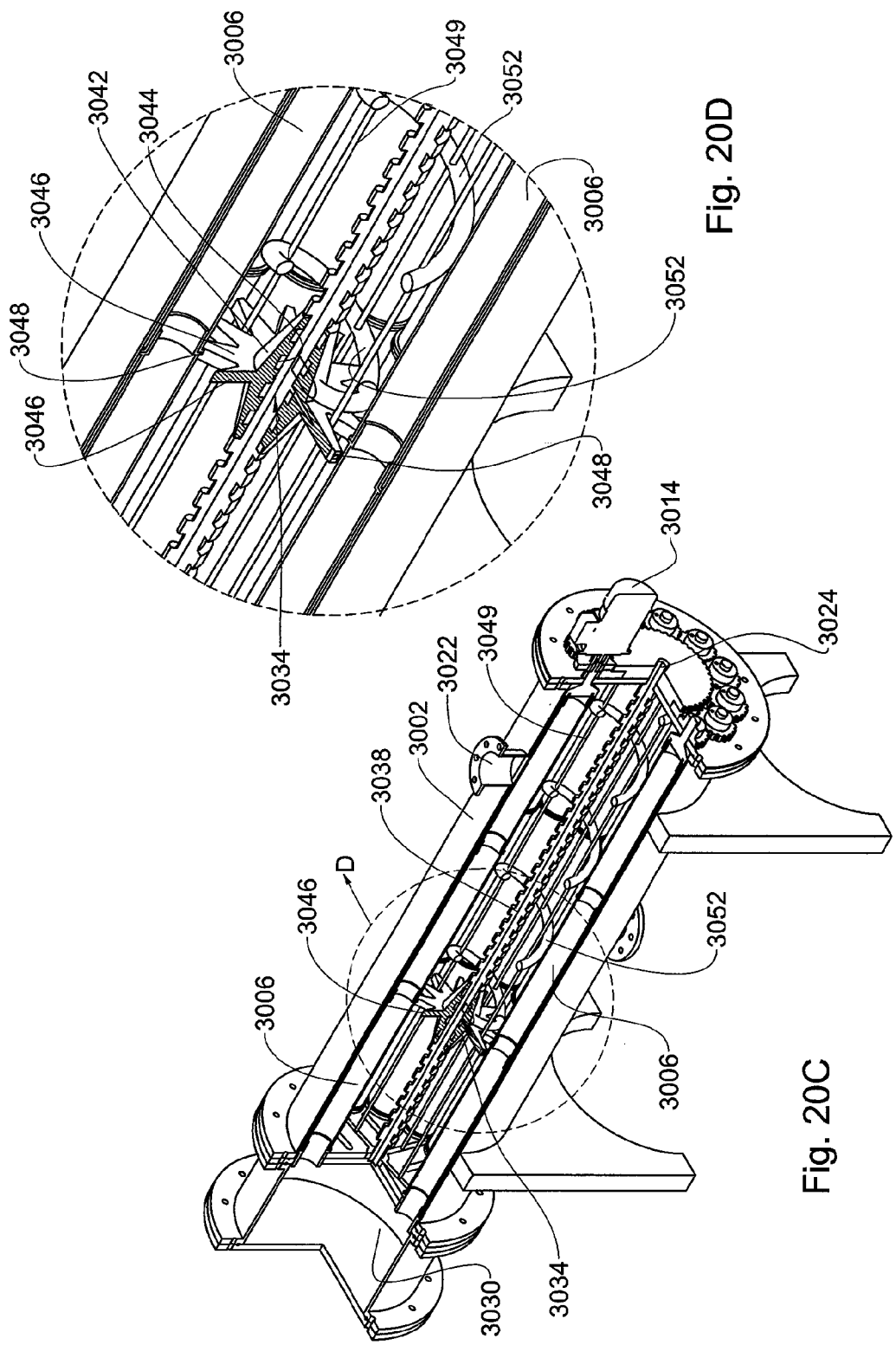
Figure 20E:
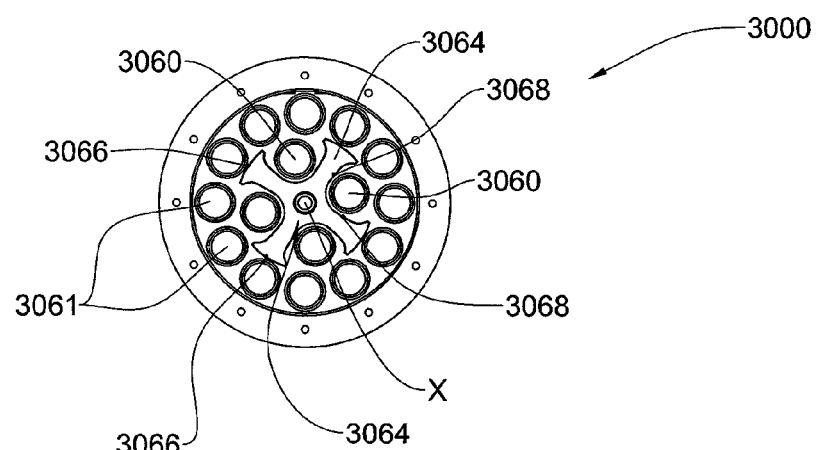

The example of FIG. 20E is similar to the previous example however differs in that it further comprises filtering units 3060 disposed in between the radially extending sprinkler arms 3064 of the rinsing mechanism generally designated 3064, in addition to a plurality of peripheral filtering units 3061. The sprinkler arms 3064 are configured with jet applying nozzles 3066 provided at the distal ends of the sprinkler arms 3064 and directed for rinsing the peripheral filtering units 3061, and jet applying nozzles 3068 directed for rinsing the filtering units 3060. In this example too, the cleaning sprinkler unit is reciprocally axially disposable and the filtering units 3060 and 3061 revolve about their longitudinal axis.

Figure 20F:
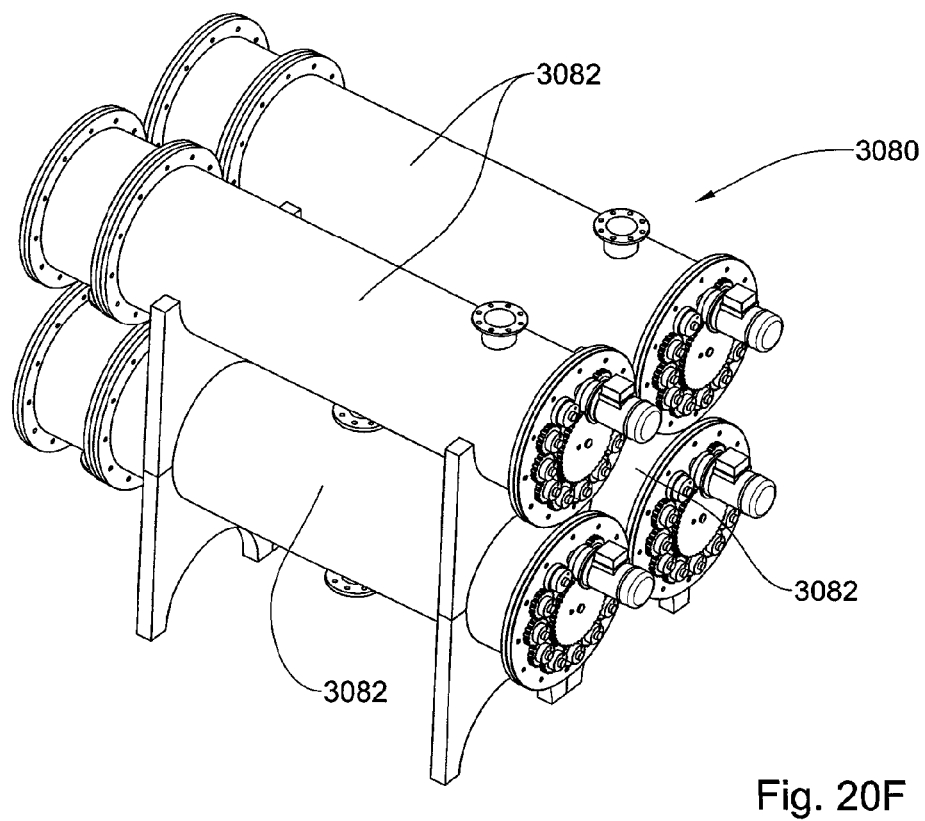

FIG. 20F illustrates a filtration station generally designated 3080 comprising a plurality (four in the present example) of filtration systems 3082 of the type discussed hereinabove in connection with FIGS. 20A to 20D, which in turn comprise a plurality of filtration units each constructed and operates as discussed hereinabove in connection with FIGS. 1 to 13. The filtration systems 3082 may be coupled to fluid supply and outtake lines in series or in parallel.

The invention claimed is:

1. A fluid filtration assembly, comprising:
 a housing configured with one or more filter units extending in fluid flow between a raw fluid inlet port and a filtered fluid outlet port, each of the one or more filter units comprising
  a cylindrical, thread-type filtration media and a thread tensioning mechanism for controlling tension of coiled threads of the thread-type filtration media, said tensioning mechanism comprising an array of thread supports axially extending and being radially displaceable between a tensioned filtering mode and a loose rinsing mode, respectively;
 a filter rinsing assembly being in fluid communication with a rinsing fluid inlet port; and
 a propulsion fluid inlet port being in flow communication with a propulsion mechanism configured for propelling one or both of the filter rinsing assembly and the filter unit with respect to one another.

2. The fluid filtration assembly according to claim 1, wherein either one or both of the filtration media and the filter rinsing assembly are configured for at least one of revolving motion and linear displacement.

3. The fluid filtration assembly according to claim 2, wherein revolving motion of either or both of the filtration media and the filter rinsing assembly is unidirectional or reciprocal.

4. The fluid filtration assembly according to claim 1, wherein filtration through the filtration media takes place in a radially inwards or radially outwards direction.

5. The fluid filtration assembly according to claim 1, wherein the thread supports are longitudinal segments which at the loose rinsing mode are radially retracted such that longitudinal edges of neighboring longitudinal segments adjoin one another, and at the tensioned filtering mode longitudinal edges of neighboring longitudinal segments are spaced.

6. The fluid filtration assembly according to claim 1, wherein at least some of the thread supports are configured with thread positioning members, said members transecting a longitudinal axis of the filtering cylinder.

7. The fluid filtration assembly according to claim 1, wherein the tensioning mechanism is configured with a mechanism for converting axial motion in a longitudinal axis into radial motion in plane normal to said longitudinal axis.

8. The fluid filtration assembly according to claim 1, wherein a displacing end plate is provided at respective ends of the tensioning mechanism, said end plates being coaxial with and axially displaceable about a longitudinal axis of the filtering cylinder and bearing against end edges of the longitudinal segments, wherein one or both of the end plates and the end edges are configured with a tapering surface, whereby axial displacement of the end plates entails radial displacement of the longitudinal segments.

9. The fluid filtration assembly according to claim 1, wherein the thread supports comprise an array of spaced apart fixed longitudinal support members and an array of rotatably disposed support beams interposed between the support members, said support beams radially projecting between said support beams substantially to the same extent as of said support members, wherein at the tensioned mode said support beams extend substantially equally distanced between two neighboring support members and at the loose mode said support beams extend adjacent one of two neighboring support members.

10. The fluid filtration assembly according to claim 1, wherein the tensioning mechanism is configured with a mechanism for converting axial motion in a longitudinal axis into radial motion in plane normal to said longitudinal axis and wherein the thread supports comprises an array of longitudinal support members having an external thread engaging surface extending parallel to the longitudinal axis and in inside surface inclined with respect to the longitudinal axis and being slidingly disposed over an equally inclined carrier member, whereby axial displacement of one or both of the support members and the carrier member towards one another entails radial expansion of the support members, and axial displacement of one or both of the support members and the carrier member away from one another entails radial retraction of the support members.

11. The fluid filtration assembly according to claim 1, wherein the support members are longitudinal bars slidingly retained within tapering grooves axially configured over cylindrical carrier member.

12. A fluid filtration system, comprising:
a housing;
a plurality of filtration units parallely disposed within the housing; and
a cleaning assembly disposed within the housing, wherein one or both of the filtration units and cleaning assembly are rotatably disposed within the housing to facilitate rinsing of filtering media of the filter units.

13. A fluid flirtation system, comprising:
a housing comprising
   a plurality of filtration units parallely disposed within the housing, and
   a cleaning assembly disposed within the housing, one or both of the filtration units and cleaning assembly are rotatably disposed within the housing and configured to facilitate rinsing of cylindrical, thread-type filtering media of the filter units,
wherein the plurality of filtration units comprise a thread tensioning mechanism for controlling tension of coiled threads of the thread-type filtration media, said tensioning mechanism comprises an array of thread supports, axially extending and being radially displaceable between a tensioned filtering mode and a loose rinsing mode, respectively.

\* \* \* \* \*